US007662481B2

(12) United States Patent
Suzuki et al.

(10) Patent No.: US 7,662,481 B2
(45) Date of Patent: Feb. 16, 2010

(54) ENDLESS BELT FOR ELECTROPHOTOGRAPHIC APPARATUS

(75) Inventors: Satoshi Suzuki, Kasugai (JP); Yousuke Hayashi, Kasugai (JP); Akihiko Kaji, Inazawa (JP); Keisuke Tokoro, Komaki (JP); Tsukasa Fujita, Komaki (JP); Shigeki Kanda, Aichi-ken (JP)

(73) Assignee: Tokai Rubber Industries, Ltd., Aichi-Ken (JP)

( * ) Notice: Subject to any disclaimer, the term of this patent is extended or adjusted under 35 U.S.C. 154(b) by 693 days.

(21) Appl. No.: 11/070,334

(22) Filed: Mar. 3, 2005

(65) Prior Publication Data

US 2005/0196202 A1 Sep. 8, 2005

(30) Foreign Application Priority Data

| | | | |
|---|---|---|---|
| Mar. 4, 2004 | (JP) | ............................. | 2004-060740 |
| Jun. 24, 2004 | (JP) | ............................. | 2004-186409 |
| Jul. 23, 2004 | (JP) | ............................. | 2004-215826 |
| Aug. 3, 2004 | (JP) | ............................. | 2004-227206 |
| Jan. 12, 2005 | (JP) | ............................. | 2005-005348 |

(51) Int. Cl.
*B32B 7/34* (2006.01)

(52) U.S. Cl. ................................ 428/474.4; 428/473.5

(58) Field of Classification Search .............. 428/423.1, 428/473.5, 474.4
See application file for complete search history.

(56) References Cited

U.S. PATENT DOCUMENTS 4,816,544 A * 3/1989 Komiya et al. ................ 528/73
5,999,788 A * 12/1999 Kanesawa et al. ........... 399/329

FOREIGN PATENT DOCUMENTS

| | | |
|---|---|---|
| JP | 7-300527 | 11/1995 |
| JP | 10-330449 | 12/1998 |
| JP | 2003-138015 | 5/2003 |
| JP | 2003-238807 | 8/2003 |
| JP | 2003-261768 | 9/2003 |
| JP | 2004-51714 | 2/2004 |
| JP | 2004-269793 | 9/2004 |
| JP | 2005-290019 A | 10/2005 |

OTHER PUBLICATIONS

Japanese Office Action dated Dec. 8, 2009 issued in corresponding Japanese Patent Application No. JP2004-227206.

* cited by examiner

*Primary Examiner*—Thao T. Tran
(74) *Attorney, Agent, or Firm*—Westerman, Hattori, Daniels & Adrian, LLP

(57) ABSTRACT

An endless belt for use as an intermediate transfer belt or a transfer-sheet transfer belt in an electrophotographic apparatus using electrophotographic technologies such as a full-color LBP (Laser Beam Printer) or a full-color PPC (Plane Paper Copier). At least a base layer of the belt comprises a modified polyamide imide resin formed by copolymerizing: (A) an aromatic isocyanate compound; (B) an aromatic polycarboxylic acid anhydride; and (C) a polymer having carboxylic acids at both terminals thereof.

11 Claims, 2 Drawing Sheets

ENDLESS BELT FOR ELECTROPHOTOGRAPHIC APPARATUS

BACKGROUND OF THE INVENTION

1. Field of the Invention

The present invention relates to an endless belt for an electrophotographic apparatus, and more particularly, to an endless belt for use as an intermediate transfer belt or a transfer-sheet transport belt in an electrophotographic apparatus using electrophotographic technologies such as a full-color LBP (Laser Beam Printer) or a full-color PPC (Plane Paper Copier).

2. Description of the Art

Generally, endless belts (seamless belts) are variously used as an image transfer belt, a transfer-sheet transport belt, a photoreceptor base or the like in an electrophotographic apparatus using electrophotographic technologies such as a full-color LBP or a full-color PPC.

As such endless belts, for example, an endless belt of a cylindrical film is used, which is formed by using a blend of fluororesin, such as PVDF (vinylidene fluoride), and an electrically conductive carbon black blended therein by means of a dipping method or the like.

The above-mentioned fluororesin belt is excellent in electrical characteristics, however, is deteriorated in belt properties such as elasticity modulus and is increased in cost.

Alternatively, use of a semi-electrically conductive tubular polyamide imide, formed by containing carbon black into a polyamide imide resin, for a transfer belt for an image forming apparatus is proposed (see Japanese Unexamined Patent Publication No. 2003-261768).

However, since the polyamide imide resin described in the above-mentioned Publication is composed of a rigid molecular structure, the polyamide imide resin has high rigidity and small elongation at break. For this reason, a transfer belt for an image forming apparatus formed by such a polyamide imide resin has poor flexibility and thus has inferior durability.

SUMMARY OF THE INVENTION

The present invention was made under such circumstances. It is an object of the present invention to provide an endless belt for an electrophotographic apparatus which has large elongation at break and excellent durability.

In accordance with a first aspect of the present invention to achieve the aforesaid objects, there is provided an endless belt for an electrophotographic apparatus, circumferentially driven in a state that a surface of the belt is in contact with or is adjacent to a photoreceptor of the electrophotographic apparatus, wherein at least a base layer of the belt comprises a modified polyamide imide resin formed by copolymerizing: (A) an aromatic isocyanate compound; (B) an aromatic polycarboxylic acid anhydride; and (C) a polymer having carboxylic acids at both terminals thereof.

In accordance with a second aspect of the present invention, there is provided an endless belt for an electrophotographic apparatus, circumferentially driven in a state that a surface of the belt is in contact with or is adjacent to a photoreceptor of the electrophotographic apparatus, wherein at least a base layer of the belt comprises a modified polyamide imide resin formed by copolymerizing: (A) an aromatic isocyanate compound; (B) an aromatic polycarboxylic acid anhydride; and (D) a silicone polymer having a polydimethylsiloxane structure in its molecule and having a group reactive with an isocyanate group of the component (A) at a terminal or both terminals thereof.

In accordance with a third aspect of the present invention, there is provided an endless belt for an electrophotographic apparatus, circumferentially driven in a state that a surface of the belt is in contact with or is adjacent to a photoreceptor of the electrophotographic apparatus, wherein at least abase layer of the belt comprises a polyamide imide resin formed by using: (A) an aromatic isocyanate compound; (B) an aromatic polycarboxylic acid anhydride; and (E) a fluorine-containing low-molecular weight organic chemical compound.

In accordance with a fourth aspect of the present invention, there is provided an endless belt for an electrophotographic apparatus, comprising at least a base layer, wherein the base layer comprises: a blend of a polyether sulfone resin and a modified polyamide imide resin formed by copolymerizing or blending (A) an aromatic isocyanate compound and (B) an aromatic polycarboxylic acid anhydride; and at least one selected from the group consisting of (C) a polymer having carboxylic acids at both terminals thereof, (D) a silicone polymer having a polydimethylsiloxane structure in its molecule and having a group reactive with an isocyanate group of the component (A) at a terminal or both terminals thereof and (E) a fluorine-containing low-molecular weight organic chemical compound.

The inventors of the present invention compiled a series of studies on an endless belt for an electrophotographic apparatus (hereinafter, just abbreviated to "an endless belt") which has large elongation at break and excellent durability. During the process of such studies, they found that, when copolymerizing or blending at least one selected from the group consisting of a polymer having carboxylic acids at both terminals thereof (component (C)), a specific silicone polymer (component (D)) and a fluorine-containing low-molecular weight organic-chemical compound (component (E)); an aromatic isocyanate compound (component (A)); and an aromatic polycarboxylic acid anhydride (component (B)) for production of a specific polyamide imide resin, and forming a base layer by using the thus obtained polyamide imide resin, favorable results can be obtained. In other words, when at least a base layer is formed by the specific polyamide imide resin in an endless belt comprising a single layer of a base layer or two or more layers including a base layer, the above-mentioned polymer having carboxylic acids at both terminals thereof (component (C)) and the like play a role as a soft segment so as to impart flexibility to the polyamide imide resin. As a result, an endless belt formed by using the polyamide imide resin has large elongation at break and excellent durability. Thus, the inventors reached this invention.

Since an endless belt according to the first aspect of the present invention comprises a single layer of a base layer or two or more layers including a base layer, wherein at least the base layer is formed by using the modified polyamide imide resin, the endless belt has a large elongation at break and excellent durability.

Since an endless belt according to the second aspect of the present invention comprises a single layer of a base layer or two or more layers including a base layer, wherein at least the base layer is formed by using the modified polyamide imide resin having the above-mentioned polydimethylsiloxane structure, durability of the endless belt is improved and friction coefficient can be decreased, which improves a problem associated with blade curling and toner releasablility.

Since an endless belt according to the third aspect of the present invention comprises a single layer of a base layer or two or more layers including a base layer, wherein at least the base layer is formed by using the polyamide imide resin comprising the fluorine-containing low-molecular weight organic chemical compound, decrease in elasticity modulus can be restrained. Therefore, even if the endless belt is allowed to stand in a state that the endless belt is set up onto a roll in a high-temperature and high-humid environment, wrinkles do not tend to occur on the endless belt and thus good images can be obtained.

Since an endless belt according to the fourth aspect of the present invention comprises a single layer of a base layer or two or more layers including a base layer, wherein the base layer is formed by using the blend of the polyether sulfone resin and the modified polyamide imide resin, the endless belt has large elongation at break, excellent durability, small variation of electrical characteristics, and excellent curling property.

DESCRIPTION OF THE PREFERRED EMBODIMENTS

Embodiments of the present invention will hereinafter be described.

Figure 1:
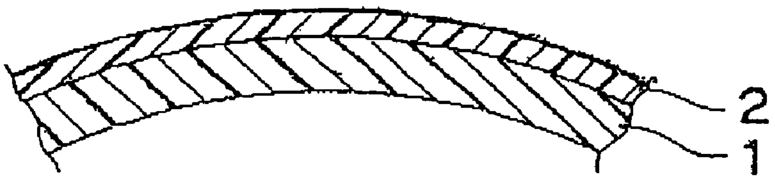
FIG. 1 is a sectional view illustrating one example of an endless belt according to the present invention.

An endless belt according to the present invention has, for example, as shown in FIG. 1, a two-layer structure of a base layer 1 and a surface layer 2 directly formed on an outer peripheral surface of the base layer. However, the endless belt of the present invention is not limited to the two-layer structure as shown in FIG. 1.

According to the present invention, at least the base layer 1 of the endless belt is formed by a base-layer material containing a specific polyamide imide resin, which is the main feature of the present invention.

The endless belt according to the present invention is classified broadly into the following four embodiments by types of the base layer material containing the specific polyamide imide resin.

First Embodiment

At least a base layer 1 of the endless belt comprises a modified polyamide imide resin formed by copolymerizing: (A) an aromatic isocyanate compound; (B) an aromatic polycarboxylic acid anhydride; and (C) a polymer having carboxylic acids at both terminals thereof.

Second Embodiment

At least a base layer 1 of the endless belt comprises a modified polyamide imide resin formed by copolymerizing: (A) an aromatic isocyanate compound; (B) an aromatic polycarboxylic acid anhydride; and (D) a silicone polymer having a polydimethylsiloxane structure in its molecule and having a group reactive with an isocyanate group of the component (A) at a terminal or both terminals thereof.

Third Embodiment

At least a base layer 1 of the endless belt comprises a polyamide imide resin formed by using: (A) an aromatic isocyanate compound; (B) an aromatic polycarboxylic acid anhydride; and (E) a fluorine-containing low-molecular weight organic chemical compound.

Fourth Embodiment

At least a base layer 1 of the endless belt comprises a blend of a polyether sulfone resin and a modified polyamide imide resin formed by copolymerizing or blending (A) an aromatic isocyanate compound and (B) an aromatic polycarboxylic acid anhydride; and at least one of (C) a polymer having carboxylic acids at both terminals thereof, (D) a silicone polymer having a polydimethylsiloxane structure and having a group reactive with an isocyanate group of the component (A) at a terminal or both terminals thereof and (E) a fluorine-containing low-molecular weight organic chemical compound.

A first embodiment of the present invention will hereinafter be described.

In the endless belt of the first embodiment, as described above, at least a base layer 1 of the endless belt comprises a modified polyamide imide (PAI) resin formed by copolymerizing (reacting): (A) an aromatic isocyanate compound; (B) an aromatic polycarboxylic acid anhydride; and (C) a polymer having carboxylic acids at both terminals thereof, which is a main feature.

The aromatic isocyanate compound (component (A)) for use in forming the modified polyamide imide (PAI) resin is not specifically limited as long as it has an aromatic ring in its molecule. Examples thereof include diphenylmethane diisocyanate (MDI), toluene diisocyanate (TDI), tolidine diisocyanate (TODI), xylylene diisocyanate (XDI), lysine diisocyanate (LDI) naphthalene diisocyanate (NDI), p-phenylene diisocyanate (PPDI) and tetramethyl xylene diisocyanate (TMXDI). These are used either alone or in combination. Among them, MDI and TODI are preferred in terms of reactivity, low cost and solubility.

The aromatic polycarboxylic acid anhydride (component (B)) is not specifically limited as long as it has an aromatic ring in its molecule and is capable of condensation-reacting with the aromatic isocyanate compound (component (A)) Examples thereof include an aromatic polycarboxylic acid anhydride (B1) and an aromatic polycarboxylic acid dianhydride (B2). These are used either alone or in combination. Further, aromatic polycarboxylic acid may be used with the aromatic polycarboxylic acid anhydride (component (B).

Examples of the aromatic polycarboxylic acid anhydride (B1) include trimellitic acid anhydride (trimellitic anhydride) and naphthalene-1,2,4-tricarboxylic acid anhydride. These are used either alone or in combination. Among them, trimellitic acid anhydride (trimellitic anhydride) is preferred in terms of reactivity, low cost and solubility.

Examples of the aromatic polycarboxylic acid dianhydride (B2) include benzene-1,2,4,5-tetracarboxylic acid dianhydride (pyromellitic dianhydride), benzophenone-3,3',4,4'-tetracarboxylic acid dianhydride, diphenyl ether-3,3'4,4'-tetracarboxylic acid dianhydride, benzene-1,2,3,4-tetracarboxylic acid dianhydride, biphenyl-3,3'4,4'-tetracarboxylic acid dianhydride, biphenyl-2,2'3,3'-tetracarboxylic acid dianhydride, naphthalene-2,3,6,7-tetracarboxylic acid dianhydride, naphthalene-1,2,4,5-tetracarboxylic acid dianhydride, naphthalene-1,4,5,8-tetracarboxylic acid dianhydride, decahydronaphthalene-1,4,5,8-tetracarboxylic acid dianhydride, 4,8-dimethyl-1,2,3,5,6,7-hexahydronaphthalene-1,2,5,6-tetracarboxylic acid dianhydride, 2,6-dichloronaphthalene-1,4,5,8-tetracarboxylic acid dianhydride, 2,7-dichloronaphthalene-1,4,5,8-tetracarboxylic acid dianhydride, 2,3,6,7-tetrachloronaphthalene-1,4,5,8-tetracarboxylic acid dianhydride, phenantholene-1,3,9,10-tetracarboxylic acid dianhydride, perylene-3,4,9,10-tetracarboxylic acid dianhydride, bis (2,3-dicarboxyphenyl) methane dianhydride, bis(3,4-dicarboxyphenyl)methane dianhydride, 1,1-bis(2,3-dicarboxyphenyl)ethane dianhydride, 1,1-bis(3,4-dicarboxyphenyl)ethane dianhydride, 2,2-bis (2,3-dicarboxyphenyl)propane dianhydride, 2,3-bis(3,4-dicarboxyphenyl)propane dianhydride, bis(3,4-dicarboxyphenyl)sulfone dianhydride, bis(3,4-dicarboxyphenyl)ether dianhydride, ethylene glycol bis (unhydro trimellitate) and propylene glycol bis (unhydro trimellitate) These are used either alone or in combination. Among them, ethylene glycol bis (unhydro trimellitate) is preferred in terms of reactivity, low cost and solubility.

As the aromatic polycarboxylic acid anhydride (component (B)) a combination use of the aromatic polycarboxylic acid anhydride (B1) and the aromatic polycarboxylic acid dianhydride (B2) is preferred. When using the combination the components (B1) and (B2), the ratio of the imido group in the PAI resin increases so that water absorption property decreases, which improves curling property of the endless belt.

The molar ratio of the component (B1) and the component (B2) is preferably (B1)/(B2)=90/10 to 50/50, particularly preferably (B1)/(B2)=80/20 to 60/40. When using the components B1 and B2 at such a ratio, it is preferred because a curling property can be improved without deteriorating flexibility.

The ratio between the number of moles (a) of isocyanate groups in the aromatic isocyanate compound (component (A)) and the total number of moles (b) of acid anhydride groups and carboxyl groups in the aromatic polycarboxylic acid anhydride (component (B)) is preferably a/b=90/100 to 130/100, particularly preferably a/b=100/100 to 120/100. When the ratio a/b falls outside the above-mentioned range, it is difficult to increase molecular weight of the PAI resin, which tends to deteriorate durability.

The polymer having carboxylic acids at both terminals thereof (component (C)) is not specifically limited as long as it has each one carboxylic acid at both terminals thereof. Examples thereof include polybutadiene having carboxylic acids at both terminals thereof, hydrogenated polybutadiene having carboxylic acids at both terminals thereof, polyester having carboxylic acids at both terminals thereof, polyamide having carboxylic acids at both terminals thereof and a poly-acrylonitrile-butadiene copolymer having carboxylic acids at both terminals thereof. These are used either alone or in combination.

The carboxylic acid for introducing thereof into both terminals of the polymers is not specifically limited. Examples thereof include aliphatic carboxylic acid and aromatic carboxylic acid. These are used either alone or in combination.

Examples of the aliphatic carboxylic acid include adipic acid, sebacic acid, suberic acid, oxalic acid, succinic acid, azelaic acid, dodecane dicarboxylate, undecane dicarboxylate, maleic acid, fumaric acid and itaconic acid. Examples of the aromatic carboxylic acid include terephthalic acid, isophthalic acid, phthalic acid, chlorophthalic acid and nitrophthalic acid.

The polymer having carboxylic acids at both terminals thereof (component (C)) may be obtained by introducing the above-mentioned carboxylic acids into both terminals of the polymers, such as polybutadiene, hydrogenated polybutadiene, polyester and polyamide, produced In accordance with the usual method. The production method of polybutadiene, hydrogenated polybutadiene, polyester and polyamide is not specifically limited. For example, polyester and polyamide can be produced in accordance with the method described in pages 208 to 231 and pages 252 to 287 of "JIKKEN KAGAKU KOUZA 28 KOUBUNSHI GOUSEI 4th edition" (edited by Chemical Society of Japan, 1992, issued by MARUZEN KABUSHIKIKAISHA).

The polyester having carboxylic acids at both terminals thereof may be produced, for example, by the following method. First, dicarboxylic acid, such as, adipic acid and sebacic acid, and diol, such as, methyl pentanediol, nonanediol and methyl octanediol, are put into a reaction vessel provided with a heater, a stirrer, refluxing means, a water separator, a distillation column and a thermometer and then taking a specified time (for example, one hour) for heating thereof up to a specified temperature (for example, 220° C.). Further, condensation reaction is continuously conducted at a specified temperature (for example, 220° C.), and then the reaction vessel is cooled to a specified temperature (for example, room temperature). Thus, the desired polyester having carboxylic acids at both terminals thereof can be obtained.

Further, other polymers each having carboxylic acids at both terminals thereof (component (C)), such as polybutadiene having carboxylic acids at both terminals thereof, may be produced by the method in accordance with the above described method.

The acid value of the polymer having carboxylic acids at both terminals thereof (component (C)) is preferably 15 to 150 mgKOH/g, particularly preferably 45 to 110 mgKOH/g.

The number average molecular weight (Mn) of the polymer having carboxylic acids at both terminals thereof (component (C)) is preferably 750 to 7,500, particularly preferably 1,000 to 2,500.

The content of the structural unit induced from of the polymer having carboxylic acids at both terminals thereof (component (C)) is preferably S to 30% by weight based on the total amount of the modified polyamide imide resin, particularly preferably 15 to 25% by weight. When the content is less than 5% by weight, durability tends to deteriorate. When the content is over 30% by weight, creep rate tends to deteriorate.

The ratio between the number of moles (a) of isocyanate groups in the aromatic isocyanate compound (component (A)), and the grand total of the total number of moles (b) of acid anhydride groups and carboxyl groups in the aromatic polycarboxylic acid anhydride (component (B)) and the total number of moles (c) of the carboxyl groups in the polymer having carboxylic acids at both terminals thereof (component (C)) is preferably a/[b+c]=90/100 to 130/100, particularly preferably a/[b+c]=100/100 to 120/100. When the ratio a/[b+c] falls outside the above-mentioned range, it is difficult to increase molecular weight of the PAI resin, which tends to deteriorate durability.

The modified PAI resin obtained by copolymerizing the above-mentioned components (A) to (C) may be produced, for example, by the following method. First, a reaction vessel provided with a stirrer, a nitrogen inlet tube, a thermometer and a cooling tube is prepared. Then, an aromatic isocyanate compound (component (A)), an aromatic polycarboxylic acid anhydride (component (B)), such as trimellitic anhydride, and a polymer having carboxylic acids at both terminals thereof (component (C)), such as polyester having carboxylic acids at both terminals thereof, are blended in each specified amount, respectively, and put in the reaction vessel. Further, polar solvent such as, N-methyl-2-pyrrolidone (NMP), N,N-dimethylformamide (DMF), N,N-dimethyl acetamide (DMAC) and γ-butyrolactone are put into the reaction vessel and then taking a specified time (preferably, 1 to 3 hours) for heating thereof up to a specified temperature (preferably 130 to 150° C.) while stirring at nitrogen gas stream. Thereafter, reaction is continuously conducted for a specified time (preferably about 3 to 5 hours) at a specified temperature (preferably, 130 to 150° C.), and then the reaction is stopped. Thus, the modified PAI resin can be obtained.

The number average molecular weight (Mn) of the thus obtained PAI resin is preferably 5,000 to 100,000, particularly preferably 10,000 to 50,000. When the Mn of the PAI resin is less than 5,000, tear strength is lowered and durability deteriorates. When the Mn of the PAI resin is over 100,000, solution viscosity increases and processability tends to deteriorate. Further, the number average molecular weight (Mn) is measured by a gel permeation chromatography (GPC) method.

As the material for forming the base layer 1 (base layer material), electrically conductive filler or a phosphorus-containing polyester resin may be used together with the modified PAI resin. Further, organic solvent, such as dimethyltormamide (DMF), DMAC, toluene, acetone and NMP, and additional filler such as calcium carbonate may be added, as required.

The electrically conductive filler is not specifically limited. Examples thereof include conductive powders such as graphite, carbon black and the like, metallic powders such as aluminium powder, stainless steel powder and the like, conductive metal oxides such as conductive zinc oxide (c-ZnO), conductive titanium dioxide (c-$TiO_2$), conductive iron oxide (C—$Fe_3O_4$), conductive stannous oxide (c-$SnO_2$) and the like, ionic conductive agents such as a quaternary ammonium salt, phosphate, sulfonate, aliphatic polyhydric alcohol, an aliphatic alcohol sulfate salt and the like. They may be used either alone or in combination. Meanwhile, the above "c-" means conductive.

As the phosphorus-containing polyester resin, those which having the phosphorous content of 3 to 15% by weight based on the total amount of the phosphorus-containing polyester resin are preferred, those which having the phosphorous content of 5 to 10% by weight are particularly preferred. When the content is within the above-mentioned range, flame retardancy is improved.

The base layer material may be prepared, for example, by blending the above-mentioned PAI resin, electrically conductive filler, organic solvent and filler, appropriately, as required, and mixing by an agitating blade, and then dispersing by a ring mill, a ball mill, a sand mill and the like.

The material for forming the surface layer 2 (surface layer material) is not specifically limited. Examples thereof include silicone resins, fluororesins, urethane resins, acrylic resins and polyamide resins. They may be used either alone or in combination. Among them, liquid type or solvent-soluble type is preferred in terms of workability. Further, to improve smear resistance, film strength or adhesiveness, those which are obtained by modifying the above-mentioned resins may be used. Examples thereof include modified acrylic resins. The modified acrylic resins are not specifically limited, as long as they have an acrylic-resin molecular structure as a base and are modified with other resin or a resin component. Silicone-modified acrylic resins are preferred.

Examples of the silicone-modified acrylic resins include silicone-grafted acrylic resins. The silicone-grafted acrylic resins are not specifically limited, as long as they are graft polymers each having an acrylic resin (main chain) grafted with a silicone resin. Specific examples thereof include SYMAC US-380 available from TOAGOSEI CO., LTD. of Tokyo, Japan.

As the surface layer material, such materials as a resin crosslinked with an isocyanate resin, an amino resin, a phenol resins, a xylene resin and the like, ultraviolet curing materials wherein photopolymerization initiator is mixed with a photosensitive monomer or a polymer.

The surface layer material may be prepared, for example, by blending the modified acrylic resin and organic solvent such as DMF, toluene, acetone and the like, appropriately, and mixing by an agitating blade. Further, each organic solvent for forming adjacent layers are preferably different each other for forming each layer with accuracy. In other words, the solvent for forming a surface layer is preferably different from the solvent for forming a base layer.

The above-described endless belt may be produced, for example, in the following manner. First, a base layer material is prepared in the same manner as described above, and is spray-coated onto a surface of a mold (cylindrical body). In turn, the thus coated mold is dried at 150 to 300° C. for 3 to 6 hours, so that a base layer 1 is formed onto a surface of the mold. Then, a surface layer material is prepared in the same manner as described above, and is coated onto a surface of the base layer 1 by dipping method, and is dried, and then the thus obtained belt is withdrawn by air-blowing onto space between the base layer 1 and the cylindrical body. Thus, the two-layer endless belt, as shown in FIG. 1, having a base layer 1 and a surface layer formed onto a surface of the base layer 1, can be produced.

The method for manufacturing the base layer 1 is not specifically limited. Examples thereof include an extrusion molding method, an inflation method, a blow molding method, a dipping method, centrifugal molding method, or the like Further, the method for manufacturing the surface layer 2 is not specifically limited. Examples thereof include a spirally coating method by means of a nozzle, a spray coating method, an extrusion molding method, an inflation method, a blow molding method, centrifugal molding method, or the like. Alternatively, a single layer endless belt can be produced by eliminating the process for forming the surface layer 2.

A second embodiment of the present invention will hereinafter be described.

The endless belt of the second embodiment comprises a modified polyamide imide (PAI) resin formed by copolymerizing: (A) an aromatic isocyanate compound; (B) an aromatic polycarboxylic acid anhydride; and (D) a silicone polymer having a polydimethylsiloxane structure and having a group reactive with an isocyanate group of the component (A) at a terminal or both terminals thereof, which is a main feature.

Each example of the aromatic isocyanate compound (component (A)) and the aromatic polycarboxylic acid anhydride (component (B)) in the second embodiment includes the same materials as described in the first embodiment.

The specific silicone polymer (component (D)) used together with components (A) and (B) is not specifically limited as long as it has a polydimethylsiloxane structure in its molecule and has a group reactive with an isocyanate group of the component (A) at a terminal or both terminals thereof. Examples thereof include those which have each one reactive group at both terminals or two reactive groups at either terminal.

The polydimethylsiloxane structure is a structure having a structural unit represented by the following formula (1) as a repetitive unit.

(1)

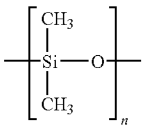

wherein n represents a positive number.

The reactive group is not specifically limited as long as it reacts with an isocyanate group of the aromatic isocyanate compound (component (A)). Examples thereof include a hydroxyl group, a carboxyl group and an amino group.

Examples of the silicone polymer having each one reactive group at both terminals thereof include a silicone polymer having carboxylic acids at both terminals thereof (BY16-750 available from Dow Corning Toray Silicone Co., Ltd. of Tokyo, Japan).

Examples of the silicone polymer having two reactive groups at either terminal include a silicone polymer having two hydroxyl groups at one terminal (X-22-176DX available from Shin-Etsu Chemical Co., Ltd. of Tokyo, Japan).

The acid value or OH value of the specific silicone polymer (component (D)) is preferably 1 to 1000 mgKOH/g, particularly preferably 4 to 150 mgKOH/g.

The number average molecular weight (Mn) of the specific silicone polymer (component (D)) is preferably 200 to 40,000, particularly preferably 1,000 to 20,000.

The blend ratio of the specific silicone polymer (component (D)) is preferably 1 to 20% by weight based on the total amount of the components (A), (B) and (D), (based on the total amount of the components (A) to (D) in the case that the polymer having carboxylic acids at both terminals thereof (component (C)) is used), particularly preferably 2 to 15% by weight. When the blend ratio is less than 1% by weight, durability of the resulting belt tends to deteriorate. When the blend ratio is over 20% by weight, elongation resistance of the resulting belt tends to deteriorate.

The modified polyamide imide resin may be prepared by copolymerizing the components (A), (B) and (D) with the polymer having carboxylic acids at both terminals thereof (component(C)). Examples of the polymer having carboxylic acids at both terminals-thereof (component (C)) include the same materials as described in the first embodiment.

The blend ratio of the polymer having carboxylic acids at both terminals thereof (component (C)) is preferably 5 to 50% by weight based on the total amount of the components (A) to (D), particularly preferably 10 to 30% by weight When the blend ratio is less than 5% by weight, durability tends to deteriorate. When the blend ratio is over 50% by weight, creep rate tends to deteriorate.

The ratio between the number of moles (a) of isocyanate groups in the aromatic isocyanate compound (component (A)), and the grand total of the total number of moles (b) of acid anhydride groups and carboxyl groups in the aromatic polycarboxylic acid anhydride (component (B)) and the total number of moles (c) of the carboxyl groups in the polymer having carboxylic acids at both terminals thereof (component (C)) is preferably a/[b+c]=90/100 to 130/100, particularly preferably a/[b+c]=100/100 to 120/100. When the ratio a/[b+c] falls outside the above-mentioned range, it is difficult to increase molecular weight of the PAI resin, which tends to deteriorate durability.

The modified PAI resin may be produced, for example, by the following method. First, a reaction vessel provided with a stirrer, a nitrogen inlet tube, a thermometer and a cooling tube is prepared. Then, an aromatic isocyanate compound (component (A)), an aromatic polycarboxylic acid anhydride (component (B)), such as trimellitic anhydride, and the specific silicone polymer (component (D)), and further a polymer having carboxylic acids at both terminals thereof (component (C)), as required, are blended in each specified amount, respectively, and put in the reaction vessel. Further, polar solvent such as, N-methyl-2-pyrrolidone (NMP), N,N-dimethylformamide (DMF), N,N-dimethyl acetamide (DMAC) and γ-butyrolactone are put into the reaction vessel and then taking a specified time (preferably, 1 to 3 hours) for heating thereof up to a specified temperature (preferably 130 to 150° C.) while stirring at nitrogen gas stream. Thereafter, reaction is continuously conducted for a specified time (preferably about 3 to 5 hours) at a specified temperature (preferably, 130 to 150° C.), and then the reaction is stopped. Thus, the modified PAI resin can be obtained.

The number average molecular weight (Mn) of the thus obtained PAI resin is preferably 5,000 to 100,000, particularly preferably 10,000 to 50,000. When the Mn of the PAI resin is less than 5.000, tear strength is lowered and durability deteriorates. When the Mn of the PAI resin is over 100,000, solution viscosity increases and processability tends to deteriorate. Further, the number average molecular weight (Mn) is measured by a gel permeation chromatography (GPC) method.

As the material for forming the base layer 1 (base layer material), an electrically conductive filler or a phosphorus-containing polyester resin may be used together with the modified PAI resin. Further, organic solvent, such as dimethylformamide (DMF), DMAC, toluene, acetone and NMP, and additional filler such as calcium carbonate may be added, as required.

Each example of the electrically conductive filler and the phosphorus-containing polyester resin include the same materials as described in the first embodiment.

The base layer material may be prepared, for example, by blending the above-mentioned PAI resin, electrically conductive filler, organic solvent and filler, appropriately, as required, and mixing by an agitating blade, and then dispersing by a ring mill, a ball mill, a sand mill and the like.

Examples of the materials for forming the surface layer 2 (surface layer material) include the same materials as described in the first embodiment.

The endless belt of the second embodiment may be produced by the same method as described in the first embodiment.

A third embodiment of the present invention will hereinafter be described.

The endless belt of the third embodiment comprises a polyamide imide (PAI) resin formed by using: the above-mentioned components (A) and (B) and further a fluorine-containing low-molecular weight organic chemical compound (component (E) which is a main feature.

Each example of the aromatic isocyanate compound (component (A)) and the aromatic polycarboxylic acid anhydride (component (B)) in the third embodiment includes the same materials as described in the first embodiment.

The fluorine-containing low-molecular weight organic chemical compound (component (E) used together with components (A) and (B) will hereinafter be described.

According to the present invention, the fluorine-containing low-molecular weight organic chemical compound (component (E)) means the composition usually having a number average molecular weight (Mn) of not more than 5,000, preferably 100 to 4,800, particularly preferably 400 to 1,500. When the Mn of the component (E) is over 5,000 flexibility originated from a polyamide imide resin tends to deteriorate. Accordingly, a fluorine-containing resin having a number average molecular weight (Mn) of several tens of thousands, such as polyvinylidene fluoride (PVDF), polytetrafluoroethylene (PTFE), polychlorotrifluoroethylene (PCTFE), polyvinyl fluoride (PVF), are not included in the fluorine-containing low-molecular weight organic chemical compound (component (E)) of the present invention. Further, the number average molecular weight (Mn) is measured by a gel permeation chromatography (GPC) method.

As the fluorine-containing low-molecular weight organic chemical compound (component (E) those which have a reactive group which reacts with an isocyanate group of the aromatic isocyanate compound (component (A)) are preferred Examples thereof include the fluorine-containing low-molecular weight organic chemical compounds represented by the following general formulae (2) to (5), which may be used either alone or in combination. Examples of the reactive group include a hydroxyl group, an epoxy group and an trialkoxy silyl group.

$$Rf—X \quad (2)$$

$$Rf—C_nH_{2n}—O—X \quad (3)$$

(4)

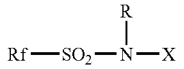

(5)

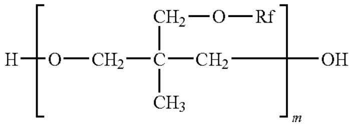

wherein Rf represents a fluorinated alkyl group, R represents an alkyl group, X represents a monovalent organic group having one or two hydroxyl groups, an epoxy group or a trialkoxy silyl group, m represents a positive number of 1 to 30 and n represents a positive number of 1 to 6.

In the fluorinated alkyl group represented by Rf of the above-mentioned general formulae (2) to (5), a carbon number is preferably 1 to 16, particularly preferably 1 to 8. In the alkyl group represented by R of the above-mentioned general formula (3), a carbon number is preferably 1 to 8, particularly preferably 1 to 3.

As the fluorine-containing low-molecular weight organic chemical compound represented by the above-mentioned general formula (2), examples include trifluoroethanol represented by the following structural formula (2a), pentadecafluorooctanol represented by the following structural formula (2b), 1H,1H,5H-octafluoropenthanol represented by the following structural formula (2c), 2,2-bis(trifluoromethyl) propanol represented by the following structural formula (2d), 2,2,3,3,3-pentafluoropropanol represented by the following structural formula (2e), 1H,1H,9H-hexadecafluorononanol represented by the following structural formula (2f) and 3-perfluorooctyl-1,2-epoxypropane represented by the following structural formula (2g).

$$CF_3CH_2OH \quad (2a)$$

$$C_7F_{15}CH_2OH \quad (2b)$$

-continued $$H(CF_2)_4CH_2OH \quad (2c)$$

$$(CF_3)_2C(CH_3)CH_2OH \quad (2d)$$

$$CF_3CF_2CH_2OH \quad (2e)$$

$$H(CF_2)_8CH_2OH \quad (2f)$$

(2g)

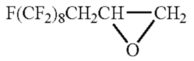

As the fluorine-containing low-molecular weight organic chemical compound represented by the above-mentioned general formula (3), examples include 3-(2-perfluorooctylethoxy)-1,2-dihydroxypropane represented by the following structural formula (3a), 3-(2-perfluorohexylethoxy)-1,2-dihydroxypropane represented by the following structural formula (3b) and 3-(2-perfluorohexylethoxy)-1,2-epoxypropane represented by the following structural formula (3c).

(3a)

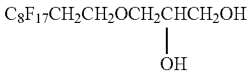

(3b)

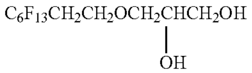

(3c)

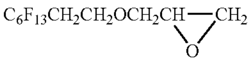

As the fluorine-containing low-molecular weight organic chemical compound represented by the above-mentioned general formula (4), examples include N-propyl-N-(2-3-dihydroxypropyl) perfluorooctanesulfone amide represented by the following structural formula (4a), N-propyl-N-(2-3-epoxypropyl) perfluorooctanesulfone amide represented by the following structural formula (4b), N-[3-(trimethoxy silyl) propyl]-N-propyl perfluorooctanesulfone amide represented by the following structural formula (4c) and N-[3-(trimethoxy silyl)propyl]-N-ethyl perfluorooctanesulfone amide represented by the following structural formula (4d).

(4a)

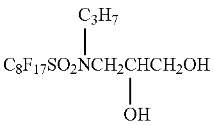

(4b)

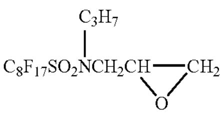

(4c)

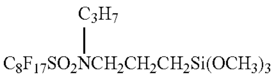

(4d)

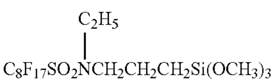

As the fluorine-containing low-molecular weight organic chemical compound represented by the above-mentioned general formula (5), examples include fluorine surface active agent (PF636 available from OMNOVA SOLUTIONS INC of Ohio, USA) represented by the following structural formula (5a), fluorine surface active agent (PF6320 available from OMNOVA SOLUTIONS INC. of Ohio, USA) represented by the following structural formula (5b), fluorine surface active agent (PF656 available from OMNOVA SOLUTIONS INC of Ohio, USA) represented by the following structural formula (5c) and fluorine surface active agent (PF6520 available from OMNOVA SOLUTIONS INC. of Ohio, USA) represented by the following structural formula (5d).

(5a)

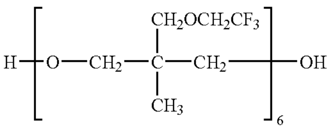

(5b)

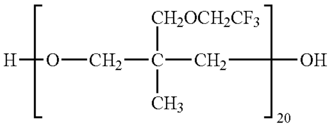

(5c)

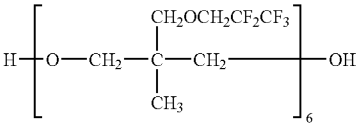

(5d)

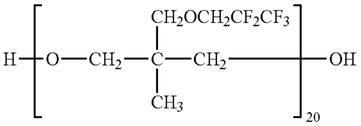

Further, a fluorine surface active agent other than those represented by the general formula (5) may be used. Examples thereof include PF651, PF652, PF151N, PFAT-1001, PFAT-1045, PFAT-1084, PFAT-1085 and PFAT-1089.

The content of the fluorine-containing low-molecular weight organic chemical compound (component (E)) is preferably 1 to 20% by weight based on the total amount of the components (A) (B) and (E) (based on the total amount including the polymer having carboxylic acids at both terminals thereof (component (C)) or polydimethylsiloxane compound in the case that such a polymer or such a compound is used), particularly preferably 2 to 15% by weight. When the content is less than 1% by weight, effects for restraining the belt from wrinkling tend to deteriorate at moist heat conditions. When the content is over 20% by weight, flexibility of the resulting belt tends to deteriorate.

According to the present invention, the polyamide imide resin may be a resin formed by copolymerizing or mixing the components (A), (B) and (E), and further at least one of a polymer having carboxylic acids at both terminals thereof (component (C)) and polydimethylsiloxane compound.

Examples of the polymer having carboxylic acids at both terminals thereof include the same materials as described in the first embodiment.

The content of the polymer having carboxylic acids at both terminals thereof (component (C)) is preferably 5 to 30% by weight based on the total amount of the components (A) to (D), particularly preferably 15 to 25% by weight. When the content is less than 5% by weight, durability tends to deteriorate. When the content is over 30% by weight, creep rate tends to deteriorate.

The ratio between the number of moles (a) of isocyanate groups in the aromatic isocyanate compound (component (A)), and the grand total of the total number of moles (b) of acid anhydride groups and carboxyl groups in the aromatic polycarboxylic acid anhydride (component (B)) and the total number of moles (c) of the carboxyl groups in the polymer having carboxylic acids at both terminals thereof (component (C)) is preferably a/[b+c]=90/100 to 130/100, particularly preferably a/[b+c]=100/100 to 120/100. When the ratio a/[b+c] falls outside the above-mentioned range, it is difficult to increase molecular weight of the PAI resin, which tends to deteriorate durability.

As the polydimethylsiloxane compound, those which have a group reactive with an isocyanate group of the aromatic isocyanate compound (component (A)) are preferred. Examples thereof include those which have each one reactive group at both terminals thereof or two reactive groups at either terminal thereof. Examples of the reactive groups include a hydroxyl group, a carboxyl group and an amino group.

Examples of the polydimethylsiloxane compound include a silicone polymer having carboxylic acids at both terminals thereof (BY16-750 available from Dow Corning Toray Silicone Co., Ltd. of Tokyo, Japan) and a silicone polymer having two hydroxyl groups at one terminal thereof (X-22-176DX available from Shin-Etsu Chemical Co., Ltd. of Tokyo, Japan).

The acid value or OH value of the polydimethylsiloxane compound is preferably 1 to 1000 mgKOH/g, particularly preferably 4 to 150 mgKOH/g.

The number average molecular weight (Mn) of the polydimethylsiloxane is preferably 200 to 40,000, particularly preferably 1,000 to 20,000.

The blend ratio of polydimethylsiloxane compound is preferably 1 to 20% by weight based on the total amount of the components (A) to (D) and the polydimethylsiloxane compound, particularly preferably 2 to 15% by weight. When the blend ratio is less than 1% by weight, durability of the resulting belt tends to deteriorate. When the blend ratio is over 20% by weight, elongation resistance of the resulting belt tends to deteriorate.

The modified PAI resin may be produced, for example, by the following method. First, a reaction vessel provided with a stirrer, a nitrogen inlet tube, a thermometer and a cooling tube is prepared. Then, an aromatic isocyanate compound (component (A)), an aromatic polycarboxylic acid anhydride (component (B), such as trimellitic anhydride, and the fluorine-containing low-molecular organic chemical compound (component (E) and further a polymer having carboxylic acids at both terminals thereof (component (C)) or the polydimethylsiloxane compound, as required, are blended in each specified amount, respectively, and put in the reaction vessel. Further, polar solvent such as, N-methyl-2-pyrrolidone (NMP), N,N-dimethylformamide (DMF), N,N-dimethyl acetamide (DMAC) and γ-butyrolactone are put into the reaction vessel and then taking a specified time (preferably, 1 to 3 hours) for heating thereof up to a specified temperature (preferably 130 to 150° C.) while stirring at nitrogen gas stream. Thereafter, reaction is continuously conducted for a specified time (preferably about 3 to 5 hours) at a specified temperature (preferably, 130 to 150° C.), and then the reaction is stopped. Thus, the modified PAZ resin can be obtained.

The number average molecular weight (Mn) of the thus obtained PAI resin is preferably 5,000 to 100,000, particularly preferably 10,000 to 50,000. When the Mn of the PAI resin is less than 5,000, tear strength is lowered and durability deteriorates. When the Mn of the PAI resin is over 100,000, solution viscosity increases and processability tends to deteriorate. Further, the number average molecular weight (Mn) is measured by a gel permeation chromatography (GPC) method.

As the material for forming the base layer 1 (base layer material), an electrically conductive filler, a phosphorus-containing polyester resin, or a polyether sulfone (PES) resin may be used together with the modified PAI resin. Further, organic solvent, such as dimethylformamide (DMF), DMAC, toluene, acetone and NMP, and additional filler such as calcium carbonate may be added, as required.

Each example of the electrically conductive filler and the phosphorus-containing polyester resin includes the same materials as described in the first embodiment.

The polyether sulfone (PES) resin is not specifically limited as long as it has a structural unit wherein an aromatic ring is bonded via a sulfonyl group ($—SO_2—$) or an ether group (—O—) as a repetitive, unit. The PES resin is a solid polymer obtained by polymerizing such a structural unit as a repetitive unit, is soluble in organic solvent, is plasticized with heat, and is a polymeric monomer which may be formed into a film by various forming methods such as an extrusion method. The plasticizing temperature (softening temperature) with heat slightly varies according to its polymerization degree (n), however, usually from 200 to 270° C.

The structural unit of the PES resin is not specifically limited, however, the structural units represented by the following chemical formulae (6) to (8) are preferably used. The PES resin is not limited to the resin wherein one unit of the structural units represented by the chemical formulae (6) to (8) is solely repeated, and may be the resin wherein two or more units of the structural units represented by the chemical formulae (6) to (8) are a repetitive unit.

(6)

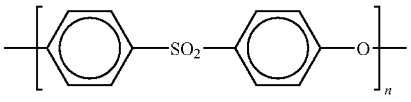

wherein n represents a positive number.

(7)

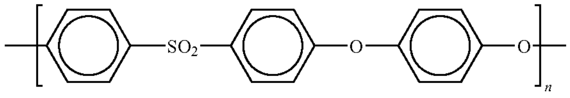

wherein n represents a positive number.

(8)

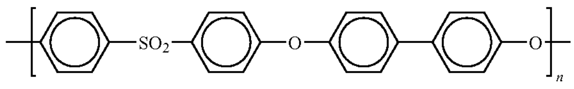

wherein n represents a positive number.

The PES resin having a structural unit represented by the chemical formula (6) as a repetitive unit is prepared, for example, by mixing 4,4'-dihydroxy diphenylsulfone and 4,4'-dichloro diphenylsulfone at equivalent mole in a polar organic solvent, and condensation polymerizing thereof, usually at 150 to 350° C.

The PES resin having a structural unit represented by the chemical formula (7) as a repetitive unit is prepared, for example, by mixing 4,4'-dichlorophenyl sulfone and 1,4'-dihydroxyphenyl at equivalent mole in a polar organic solvent, and condensation polymerizing thereof, usually at 150 to 350° C.

The PES resin having a structural unit represented by the chemical formula (8) as a repetitive unit is prepared, for example, by mixing 4,4'-dichlorophenylsulfone and 4,4'-dihydroxydiphenyl at equivalent mole in a polar organic solvent, and condensation polymerizing thereof, usually at 150 to 350° C.

The organic solvent is not specifically limited. However, those in which starting materials and the prepared PES resins are soluble are preferred. Examples thereof include N,N-dimethylformamide (DMF), N,N-dimethyl acetamide (DMAC) and N-methyl-2-pyrrolidone (NMP).

The structural unit represented by the chemical formula (8) is not limited to those which have two phenyl groups connected directly to each other. Those which have two phenyl groups connected via an alkylene group or the like may be used.

The number average molecular weight (Mn) of the PES resin is preferably 10,000 to 500,000, particularly preferably 20,000 to 400,000.

The blend ratio of the PES resin is preferably 1 to 60 parts by weight (hereinafter, just abbreviated to "parts") based on 100 parts of the polyamide imide, particularly preferably 10 to 40 parts.

The base layer material may be prepared, for example, by blending the above-mentioned PAI resin, an electrically conductive filler, a phosphorus-containing polyester resin, a PES resin, a filler and organic solvent, appropriately, as required, and mixing by an agitating blade, and then dispersing by a ring mill, a ball mill, a sand mill and the like.

Examples of the materials for forming the surface layer 2 (surface layer material) include the same materials as described in the first embodiment.

The endless belt of the third embodiment may be produced by the same method as described in the first embodiment.

A fourth embodiment of the present invention will hereinafter be described.

According to the endless belt of the fourth embodiment, at least a base layer of the endless belt comprises a blend of a polyether sulfone (PES) resin and a modified polyamide imide (PAI) resin formed by copolymerizing or blending (A) an aromatic isocyanate compound and (B) an aromatic polycarboxylic acid anhydride; and at least one of (C) a polymer having carboxylic acids at both terminals thereof, (D) a silicone polymer having a polydimethylsiloxane structure and having a group reactive with an isocyanate group of the component (A) at a terminal or both terminals thereof and (E) a fluorine-containing low-molecular weight organic chemical compound, which is a main feature.

Each example of the aromatic isocyanate compound (component (A)), the aromatic polycarboxylic acid anhydride (component (B)) and the polymer having carboxylic acids at both terminals thereof (component (C)) in the fourth embodiment includes the same materials as described in the first embodiment. Examples of the silicone polymer (component (D)) include the same materials as described in the second embodiment. Examples of the fluorine-containing low-molecular weight organic chemical compound (component (E)) include the same materials as described in the third embodiment.

The polyether sulfone (PES) resin used together with the above-mentioned specific modified polyamide imide resin will hereinafter be described.

Examples of the polyether sulfone (PES) resin in the fourth embodiment include the same materials as described in the third embodiment.

The mixing ratio of the PES resin and the specific modified PAI resin is preferably 99/1 to 1/99, particularly preferably 90/10 to 10/90. The optimum mixing ratio is determined according to requirements in this range. For example, when being used in a belt unit where a small-diameter roller is disposed or a small-angle belt unit, the mixing ratio of the PES resin is increased so as to improve curling property. When regarding durability as important, the mixing ratio of the modified PAI resin is increased so as to increase toughness and tear propagation strength.

As the material for forming the base layer 1 (base layer material), an electrically conductive filler or a phosphorus-containing polyester resin may be used together with the modified PAI resin and the PES resin. Further, organic solvent, such as DMF, DMAC, toluene, acetone and NMP, and additional filler such as calcium carbonate may be added, as required.

Each example of the electrically conductive filler and the phosphorus-containing polyester resin includes the same materials as described in the first embodiment.

The base layer material may be prepared, for example, by blending the above-mentioned PAI resin, the PES resin, electrically conductive filler, organic solvent and filler, appropriately, as required, and mixing by ah agitating blade, and then dispersing by a ring mill, a ball mill, a sand mill and the like.

The material (surface layer material) for forming the surface layer 2 formed on an outer peripheral surface of the base layer 1 is not specifically limited However, the surface layer has preferably pencil hardness of B to 5H and a contact angle with pure water of 80 to 120°, particularly preferably pencil hardness of F to 2H and a contact angle with pure water of 100 to 120° When the pencil hardness is less than B, toner may impair the surface layer 2, resulting in filming phenomenon. When the pencil hardness is over 5H, the surface layer 2 tends to easily cause cracking, which may cause filming phenomenon. Further, when the contact angle is less than 80° C., cleaning deficiency occurs after the second transfer. When the contact angle is over 120° C., transfer efficiency of the first transfer deteriorates.

The pencil hardness is measured based on pencil scratch values according to Japanese Industrial Standard (JIS) K 5600-5-4. The contact angle is measured according to JIS R3257.

The material for forming the surface layer 2 (surface layer material) is not specifically limited. Examples thereof include silicone resins, fluororesins, urethane resins, acrylic resins and polyamide resins, which are the same as described in the first embodiment.

The endless belt of the fourth embodiment may be produced by the same method as described in the first embodiment.

The base layer 1 of the endless belts according to the above-mentioned first to fourth embodiments has preferably the volume resistivity of $10^4$ to $10^{16}$ Ω·cm, particularly preferably of $10^5$ to $10^{13}$ Ω·cm. The volume resistivity can be measured, for example, with 100V applied by means of Hiresta-UP MCP-HT450 and HRS probe, both available from Mitsubishi Chemical Corporation of Tokyo, Japan.

Each layer thickness of the endless belts according to the above-mentioned first to fourth embodiments is appropriately decided according to the application. The thickness of the base layer 1 is usually 30 to 300 μm, preferably 50 to 200 μm. The thickness of the surface layer 2 is preferably 0.1 to 10 μm, particularly preferably 0.5 to 5 μm. Further, the inner periphery length is preferably 90 to 1500 mm and the width is preferably about 100 to 500 mm. This is because these measurements are suitable when being incorporated in an electrophotographic apparatus.

The structure of the endless belts according to the above-mentioned first to fourth embodiments is not specifically limited as long as it has at least a base layer 1. The structure is not limited to the two-layer structure, as shown in FIG. 1, where a surface layer 2 is directly formed on an outer peripheral surface of a base layer 1. The endless belt may have a single-layer structure only formed by a base layer 1, a three-layer structure wherein a thermoplastic resin layer or an elastic rubber layer is intervened between the base layer 1 and the surface layer 2, a four-layer structure wherein both of a thermoplastic resin layer and an elastic rubber layer are intervened between the base layer 1 and the surface layer 2. However, the base layer 1 is required to be formed by using the above-mentioned PAI resin in these cases.

The material for forming the thermoplastic resin layer intervened between the base layer land the surface layer 2 is not specifically limited. However, solvents such as methyl ethyl ketone (MEK) and toluene, as required, are used together with the thermoplastic resin. Further, the electrically conductive filler, as described above, may be blended in the materials for forming the thermoplastic resin layer.

The thermoplastic resin is not specifically limited. Examples thereof include fluororesins, such as polyvinylidene fluoride (PVDF), tetrafluoroethylene-perfluoroalkylvinylether copolymer (PFA) and ethylene-tetrafluoroethylene copolymer (ETFE), polyethylene resins, polystyrene resins, acrylic resins, polycarbonate (PC) resins, polyamide resins, EVA (ethylene-vinyl acetate resin copolymer) resins, EEA (ethylene-ethyl acrylate copolymer) resins. These are used either alone or in combination. Among them, fluororesins such as PVDF are preferred in terms of excellent flame retardancy.

The material for forming the elastic rubber layer intervened between the base layer 1 and the surface layer 2 is not specifically limited. However, a vulcanizing accelerator, a solvent, a process aid, antioxidant and the like are used, as required, together with a rubber material and a vulcanizing agent. Further, the electrically conductive filler, as described above, may also be blended in the materials for forming the elastic rubber layer.

The endless belt having a three-layer structure comprising the base layer 1, the surface layer 2 and the thermoplastic resin layer formed between the base layer 1 and the surface layer 2 may be produced, for example, in the following manner. First, the base layer 1 is formed in the same manner as described above, and the material for forming the thermoplastic resin layer is spray-coated onto a surface of the base layer 1 for forming the thermoplastic resin layer on a surface of the base layer 1. In turn, the surface layer 2 is formed on a surface of the thermoplastic resin layer in the same manner as described above. Thus, the three-layer endless belt having a base layer 1, the thermoplastic resin layer formed on a surface of the base layer and a surface layer 2 formed onto a surface of the thermoplastic resin layer, can be produced.

The thickness of the thermoplastic resin layer is usually from 10 to 200 μm, preferably, 10 to 100 μm.

The rubber material is not specifically limited. However, in terms of flame retardancy, chlorinated polyethylene rubber (CPE), chloroprene rubber (CR) and the like are used. Among them, the optimum material is selected according to requirements such as electrical properties, elasticity and durability.

The endless belt having a three-layer structure comprising the base layer 1, the surface layer 2 and the elastic rubber layer formed between the base layer 1 and the surface layer 2 may be produced, for example, in the following manner. First, the base layer 1 is formed in the same manner as described above, and the material for forming the elastic rubber layer is spray-coated onto a surface of the base layer 1 for forming the elastic rubber layer on a surface of the base layer 1. In turn, the surface layer 2 is formed on a surface of the elastic rubber layer in the same manner as described above. Thus, the three-layer endless belt having a base layer 1, the elastic rubber layer formed onto a surface of the base layer 1 and a surface layer 2 formed onto a surface of the elastic rubber layer, can be produced.

The thickness of the elastic rubber layer is usually from 10 to 200 μm, preferably, 10 to 100 μm.

The endless belt having a four-layer structure comprising the base layer 1, the surface layer 2 and the thermoplastic resin layer and the elastic rubber layer formed in this order between the base layer 1 and the surface layer 2 may be produced, for example, in the following manner. First, the base layer 1 is formed in the same manner as described above, and the material for forming the thermoplastic resin layer is spray-coated onto a surface of the base layer 1, and is dried by heating, and then the solvent is eliminated for forming the thermoplastic resin layer on a surface of the base layer 1. In turn, the elastic rubber layer is spray-coated onto a surface of the thermoplastic resin layer for forming the elastic rubber layer on a surface of the thermoplastic resin layer. In turn, the surface layer 2 is formed on a surface of the elastic rubber layer in the same manner as described above. Thus, the four-layer endless belt having a base layer 1, the thermoplastic resin layer formed onto a surface of the base layer 1, the elastic rubber layer formed onto a surface of the thermoplastic resin layer and a surface layer 2 formed onto a surface of the elastic rubber layer, can be produced.

The endless belts related to the first to the fourth embodiments are preferably used as an image transfer belt, a transfer-sheet transport belt, a photoreceptor base or the like in an electrophotographic apparatus using electrophotographic technologies such as a full-color LBP or a full-color PPC. However, application thereof is not limited thereto. For example, the endless belts of these embodiments may be used as a transfer belt for a single-color electrophotographic copier instead of full-color PPC.

Examples of the present invention will hereinafter be described.

First, Examples of the endless belt according to the first embodiment will be described with reference to Comparative Example.

EXAMPLE 1A

Preparation of Base Layer Material

First, 22 parts of MDI (Milionate MT (Mn: 250.06) available from NIPPON POLYURETHANE INDUSTRY CO., LTD. of Tokyo, Japan), 29 parts of TODI (TODI/R203 (Mn: 264.29) available from NIPPON SODA CO., LTD. of Tokyo, Japan), 36 parts of trimellitic anhydride (Mn: 192.12) as aromatic polycarboxylic acid anhydride (B1), 20 parts of polybutadiene having carboxylic acids at both terminals thereof (C-1000 (acid value: 52 mgKOH/g, Mn:2158) available from NIPPON SODA CO., LTD. of Tokyo, Japan) and 250 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared. Then, 4 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Preparation of Surface Layer Material

The surface layer material was prepared by blending 100 parts of a silicone-grafted acrylic, resin (SYMAC US-380 available from TOAGOSEI CO., LTD. of Tokyo, Japan) with toluene solvent and mixing by means of an agitating blade.

Production of Endless Belt

A mold (cylindrical body) was prepared. The above-mentioned base layer material was spray-coated onto a surface of the mold for forming a base layer on a surface of the mold and was heated at 250° C. for 2 hours. Then, the above-mentioned surface layer material was coated onto a surface of the base layer by dipping method, and was dried, and then the thus obtained belt was withdrawn by air-blowing onto space between the base layer and the cylindrical body. Thus, the two-layer endless belt having a base layer (thickness: 80 μm) and a surface layer (thickness: 1 μm) formed onto a surface of the base layer, was produced.

EXAMPLE 2A

The base layer material was prepared in substantially the same manner as in Example 1A, except that the blend ratio of trimellitic anhydride was changed to 35 parts, and hydrogenated polybutadiene having carboxylic acids at both terminals thereof (CI-1000 (acid value: 59 mgKOH/g, Mn: 1902) available from NIPPON SODA CO., LTD. of Tokyo, Japan) was used instead of polybutadiene having carboxylic acids at both terminals thereof (C-1000 available from NIPPON SODA CO., LTD. of Tokyo, Japan). An endless belt was produced in substantially the same manner as in Example 1A, except that this base layer material was used.

EXAMPLE 3A

The base layer material was prepared in substantially the same manner as in Example 1A, except that the blend ratio of trimellitic anhydride was changed to 34 parts, and polyester having carboxylic acids at both terminals thereof (CLOVAX 300-8S (acid value: 103 mgKOH/g, Mn: 1089) available from Nippon Kasei Chemical Co., Ltd. of Tokyo, Japan) was used instead of polybutadiene having carboxylic acids at both terminals thereof (C-1000 available from NIPPON SODA CO., LTD. of Tokyo, Japan). An endless belt was produced in substantially the same manner as in Example 1A, except that this base layer material was used.

EXAMPLE 4A

The base layer material was prepared in substantially the same manner as in Example 1A, except that polyamide having carboxylic acids at both terminals thereof (acid value: 38.0 mgKOH/g, Mn: 2953) comprising a dimer acid of $C_{36}$ (comprising a dimer of unsaturated fatty acids of $C_{18}$) and hexamethylene diamine was used instead of polybutadiene having carboxylic acids at both terminals thereof (C-1000 available from NIPPON SODA CO., LTD. of Tokyo, Japan). An endless belt was produced in substantially the same manner as in Example 1A, except that this base layer material was used.

EXAMPLE 5A

Preparation of Base Layer Material

First, 22 parts of MDI (Milionate MT (Mn: 250.06) available from NIPPON POLYURETHANE INDUSTRY CO., LTD. of Tokyo, Japan), 29 parts of TODI (TODI/R203 (Mn: 264.29) available from NIPPON SODA CO., LTD. of Tokyo, Japan), 37 parts of trimellitic anhydride (Mn: 192.12) as aromatic polycarboxylic acid anhydride (B1), 5 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 220 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared. Then, 4 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Production of Endless Belt

An endless belt was produced in substantially the same manner as in Example 1A, except that the thus obtained base layer material was used. Thus, the two-layer endless belt having a base layer (thickness: 80 μm) and a surface layer (thickness: 1 μm) formed onto a surface of the base layer, was produced.

EXAMPLE 6A

Preparation of Base Layer Material

First, 22 parts of MDI (Milionate MT (Mn: 250.06) available from NIPPON POLYURETHANE INDUSTRY CO., LTD. of Tokyo, Japan), 29 parts of TODI (TODI/R203 (Mn: 264.29) available from NIPPON SODA CO., LTD. of Tokyo, Japan), 31 parts of trimellitic anhydride (Mn: 192.12) as aromatic polycarboxylic acid anhydride (B1), 35 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 280 parts Of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared. Then, 4 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Production of Endless Belt

An endless belt was produced in substantially the same manner as in Example 1A, except that the thus obtained base layer material was used. Thus, the two-layer endless belt having a base layer (thickness: 80 μm) and a surface layer (thickness: 1 μm) formed onto a surface of the base layer, was produced.

EXAMPLE 7A

Preparation of Base Layer Material

First, 22 parts of MDI (Milionate MT (Mn: 250.06) available from NIPPON POLYURETHANE INDUSTRY CO., LTD. of Tokyo, Japan), 29 parts of TODI (TODI/R203 (Mn: 264.29) available from NIPPON SODA CO., LTD. of Tokyo, Japan), 34 parts of trimellitic anhydride (Mn: 192.12) as aromatic polycarboxylic acid anhydride (B1), 20 parts of polyester having carboxylic acids at both terminals thereof (CLOVAX 300-8S(acid value: 103 mgKOH/g, Mn: 1089) available from Nippon Kasei Chemical Co., Ltd. of Tokyo, Japan) and 270 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared. Then, 4 parts of carbon black (Show Black N220 available from SHOWA CABOT K.K. of Tokyo, Japan) and 8 parts of phosphorus-containing polyester (phosphorus content: 5.5% by weight) produced in the following manner were blended in the thus obtained PAI-NMP solution, and were mixed by an agitating blade, and then were dispersed by a ball mill. Thus, the base layer material was prepared.

The phosphorus-containing polyester was prepared as follows. First, 65 parts of dimethyl phthalate, 290 parts of ethylene glycol and 125 parts of a phosphinic acid derivative represented from the following structural formula (9) were mixed, and 0.1% by weight of manganese acetate, 0.5% by weight of lithium acetate and 0.03% by weight of antimony trioxide were further mixed relative to a total amount of the dimethyl terephthalate and the phosphinic acid derivative as a catalyst. Thus, ester exchange reaction was conducted at a normal pressure and 160 to 220° C. for 3 hours and a approximate theoretical amount of methanol was withdrawn. In turn, the temperature of the system was increased to 250° C. and the pressure was gradually reduced down to 1 Torr or less for reaction for 6 hours. Thus, phosphorous-containing polyester (Mn: 9,000) containing phosphorous at 5.5% by weight was obtained.

(9)

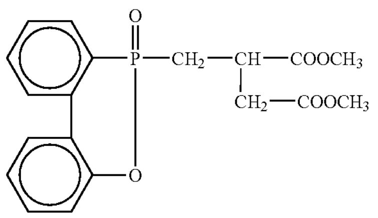

Production of Endless Belt

An endless belt was produced in substantially the same manner as in Example 1A, except that the thus obtained base layer material was used. Thus, the two-layer endless belt having a base layer (thickness: 80 μm) and a surface layer (thickness: 1 μm) formed onto a surface of the base layer, was produced.

EXAMPLE 8A

Preparation of Base Layer Material

First, 22 parts of MDI (Milionate MT (Mn: 250.06) available from NIPPON POLYURETHANE INDUSTRY CO., LTD. of Tokyo, Japan), 29 parts of TODI (TODI/R203 (Mn: 264.29) available from NIPPON SODA CO., LTD. of Tokyo, Japan), 37 parts of trimellitic anhydride (Mn: 192.12) as aromatic polycarboxylic acid anhydride (B1), 3 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 220 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 25% by weight) was prepared. Then, 4 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Production of Endless Belt

An endless belt was produced in substantially the same manner as in Example 1A, except that the thus obtained base layer material was used. Thus, the two-layer endless belt having a base layer (thickness: 80 μm) and a surface layer (thickness: 1 μm) formed onto a surface of the base layer, was produced.

EXAMPLE 9A

Preparation of Base Layer Material

First, 20 parts of MDI (Milionate MT (Mn: 250.06) available from NIPPON POLYURETHANE INDUSTRY CO., LTD. of Tokyo, Japan), 25 parts of TODI (TODI/R203 (Mn: 264.29) available from NIPPON SODA CO., LTD. of Tokyo, Japan), 34 parts of trimellitic anhydride (Mn: 192.12) as aromatic polycarboxylic acid anhydride (B1), 20 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 240 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared. Then, 4 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Production of Endless Belt

An endless belt was produced in substantially the same manner as in Example 1A, except that the thus obtained base layer material was used. Thus, the two-layer endless belt having a base layer (thickness: 80 μm) and a surface layer (thickness: 1 μm) formed onto a surface of the base layer, was produced.

EXAMPLE 10A

Preparation of Base Layer Material

First, 29 parts of MDI (Milionate MT (Mn: 250.06) available from NIPPON POLYURETHANE INDUSTRY CO., LTD. of Tokyo, Japan), 37 parts of TODI (TODI/R203 (Mn: 264.29) available from NIPPON SODA CO., LTD. of Tokyo, Japan), 34 parts of trimellitic anhydride (Mn: 192.12) as aromatic polycarboxylic acid anhydride (B1), 20 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 300 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared. Then, 5 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Production of Endless Belt

An endless belt was produced in substantially the same manner as in Example 1A, except that the thus obtained base layer material was used. Thus, the two-layer endless belt having a base layer (thickness: 80 μm) and a surface layer (thickness: 1 μm) formed onto a surface of the base layer, was produced.

EXAMPLE 11A

Preparation of Base Layer Material

First, 22 parts of MDI (Milionate MT (Mn: 250.06) available from NIPPON POLYURETHANE INDUSTRY CO., LTD. of Tokyo, Japan), 29 parts of TODI (TODI/R203 (Mn: 264.29) available from NIPPON SODA CO., LTD. of Tokyo, Japan), 25 parts of trimellitic anhydride (Mn: 192.12) as aromatic polycarboxylic acid anhydride (B1), 18 parts of ethylene glycolbis (anhydro trimellitate) (Rikasid TMEG-100 (Mn: 410.3) available from New Japan Chemical Co., Ltd. of Osaka, Japan) as aromatic polycarboxylic acid dianhydride (B2), 20 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 270 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared. Then, 4 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Production of Endless Belt

An endless belt was produced in substantially the same manner as in Example 1A, except that the thus obtained base layer material was used. Thus, the-two-layer endless belt having a base layer (thickness: 80 μm) and a surface layer (thickness: 1 μm) formed onto a surface of the base layer, was produced.

EXAMPLE 12A

Preparation of Base Layer Material

First, 22 parts of MDI (Milionate MT (Mn: 250.06) available from NIPPON POLYURETHANE INDUSTRY CO., LTD. of Tokyo, Japan), 29 parts of TODI (TODI/R203 (Mn: 264.29) available from NIPPON SODA CO., LTD. of Tokyo, Japan), 30 parts of trimellitic anhydride (Mn: 192.12) as aromatic polycarboxylic acid anhydride (B1), 7 parts of ethylene glycolbis (anhydro trimellitate) (Rikasid TMEG-100 (Mn: 410.3) available from New Japan Chemical Co., Ltd. of Osaka, Japan) as aromatic polycarboxylic acid dianhydride (B2), 20 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 250 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared. Then, 4 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Production of Endless Belt

An endless belt was produced in substantially the same manner as in Example 1A, except that the thus obtained base layer material was used. Thus, the two-layer endless belt having a base layer (thickness: 80 μm) and a surface layer (thickness: 1 μm) formed onto a surface of the base layer, was produced.

EXAMPLE 13A

Preparation of Base Layer Material

First, 22 parts of MDI (Milionate MT (Mn: 250.06) available from NIPPON POLYURETHANE INDUSTRY CO., LTD. of Tokyo, Japan), 29 parts of TODI (TODI/R203 (Mn: 264.29) available from NIPPON SODA CO., LTD. of Tokyo, Japan), 17 parts of trimellitic anhydride (Mn: 192.12) as aromatic polycarboxylic acid anhydride (B1), 36 parts of ethylene glycolbis (anhydro trimellitate) (Rikasid TMEG-100 (Mn: 410.3) available from New Japan Chemical Co., Ltd. of Osaka, Japan) as aromatic polycarboxylic acid dianhydride (B2), 20 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 300 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared. Then, 5 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Production of Endless Belt

An endless belt was produced in substantially the same manner as in Example 1A, except that the thus obtained base layer material was used. Thus, the two-layer endless belt having a base layer (thickness: 80 μm) and a surface layer (thickness: 1 μm) formed onto a surface of the base layer, was produced.

COMPARATIVE EXAMPLE A

Preparation of Base Layer Material

A base layer material was prepared in substantially the same manner as in Example 1A, except that the polymer having carboxylic acids at both terminals thereof was not blended. First, 22 parts of MDI (Milionate MT (Mn: 250.06) available from NIPPON POLYURETHANE INDUSTRY CO., LTD. of Tokyo, Japan), 29 parts of TODI (TODI/R203 (Mn:264.29) available from NIPPON SODA CO., LTD. of Tokyo, Japan), 37 parts of trimellitic anhydride and 200 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared. Then, 4 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Production of Endless Belt

An endless belt was produced in substantially the same manner as in Example 1A, except that the thus obtained base layer material was used. Thus, the two-layer endless belt having a base layer (thickness: 80 μm) and a surface layer (thickness: 1 μm) formed onto a surface of the base layer, was produced.

The endless belts of Examples 1A to 13A and Comparative Example A thus produced were evaluated on the following criteria. The results are shown in Tables 1 to 2. Each ratio between the number of moles (a) of isocyanate groups in the aromatic isocyanate compound, and the grand total of the total number of moles (b) of acid anhydride groups and carboxyl groups in the aromatic polycarboxylic acid anhydride and the total number of moles (c) of the carboxyl groups in the polymer having carboxylic acids at both terminals thereof is also shown in Tables 1 and 2. The molar ratio (B1/B2) of the aromatic polycarboxylic acid anhydride (B1) and the aromatic polycarboxylic acid dianhydride (B2) is also shown in Tables 1 and 2.

Content of Polymer Having Carboxylic Acids at Both Terminals Thereof

The content of the polymer having carboxylic acids at both terminals thereof in the PAI resin each obtained by Examples and Comparative Examples was determined. That is, calculated was the content (% by weight) of the structural unit derived from the polymer (component (C)) having carboxylic acids at both terminals thereof in the polyamide imide resin obtained by copolymerizing (A) an aromatic isocyanate compound; (B) an aromatic polycarboxylic acid anhydride; and (C) a polymer having carboxylic acids at both terminals thereof.

PAI (Mn)

The PAI resin obtained by each of Examples and Comparative Example was diluted with THF and each molecular amount (in terms of polystyrene) was measured according to the GPC method.

Elongation Modulus and Elongation at Break

Elongation modulus and elongation at break were each measured in accordance with JIS K7127. The stress rate was 10±2.0 mm per minute.

Creep Rate

The endless belt was cut into a strip so as to prepare a testpiece having a size of 20 mm×180 mm. The testpiece was hung up with a load of 250±5 g applied to an end thereof. The creep rate was calculated after the testpiece was allowed to stand at 50° C.×95% for 24 hours.

Flexibility

The number of time of MIT was measured with a load of 9.8N by means of Folding Endurance Tester MIT-D available from Toyo Seiki Seisaku-Sho Ltd. of Tokyo, Japan in accordance with JIS P8115. This number of time is an index for evaluation of flexibility. More times indicates excellent flexibility.

Bench Durability Test

Two metallic rollers each having a diameter of 13 mm were prepared. An endless belt having a width of 150 mm was stretched between two rollers. In such a state, one of the rollers was fixed on a table. In turn, the other roller was disposed at the distal end of the table. Both ends of the roller disposed at the distal end of the table were hung with a load of 2 kg, respectively, (in total, 4 kg). In such a state, the endless belt was rotated under laboratory conditions of 25° C.×40% RH. The number of accumulated time was measured until cracking was identified.

Flame Retardancy

Evaluation test for flame retardancy was conducted in accordance with UL-94 by using the base layer material of each endless belt. In the evaluation, "VTM-1" is superior to "VTM-0".

Water Absorption

The endless belt was cut into a strip having a size of 10 mm×150 mm for producing a testpiece. The testpiece was allowed to stand at 80° C.×95% RH for 24 hours. Water absorption was calculated by the weight change before and after.

Opening Angle

Figure 2:
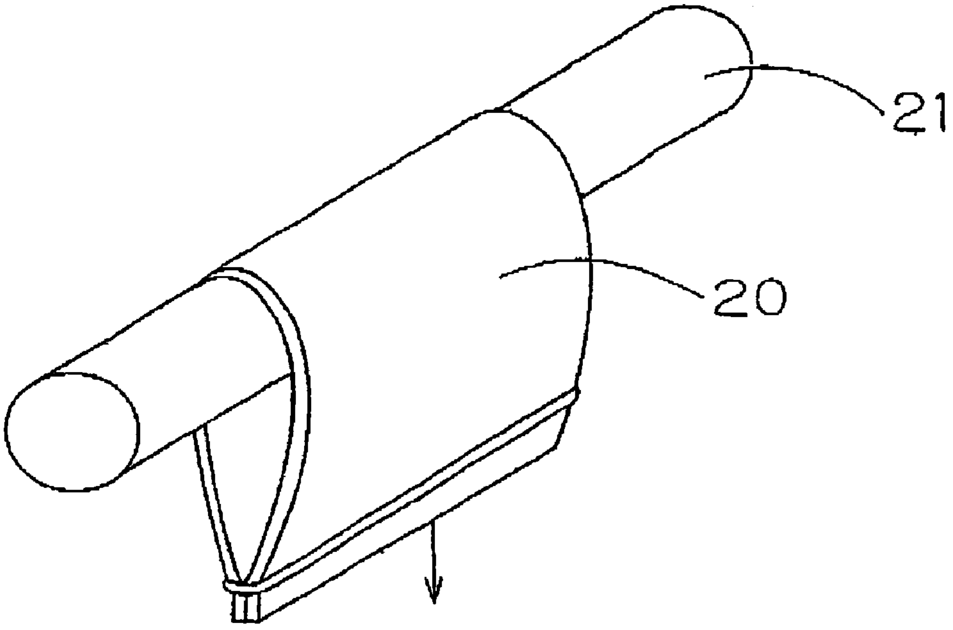
FIG. 2 is an explanatory view of a method of measuring an opening angle of an endless belt according to the present invention.
Figure 3:
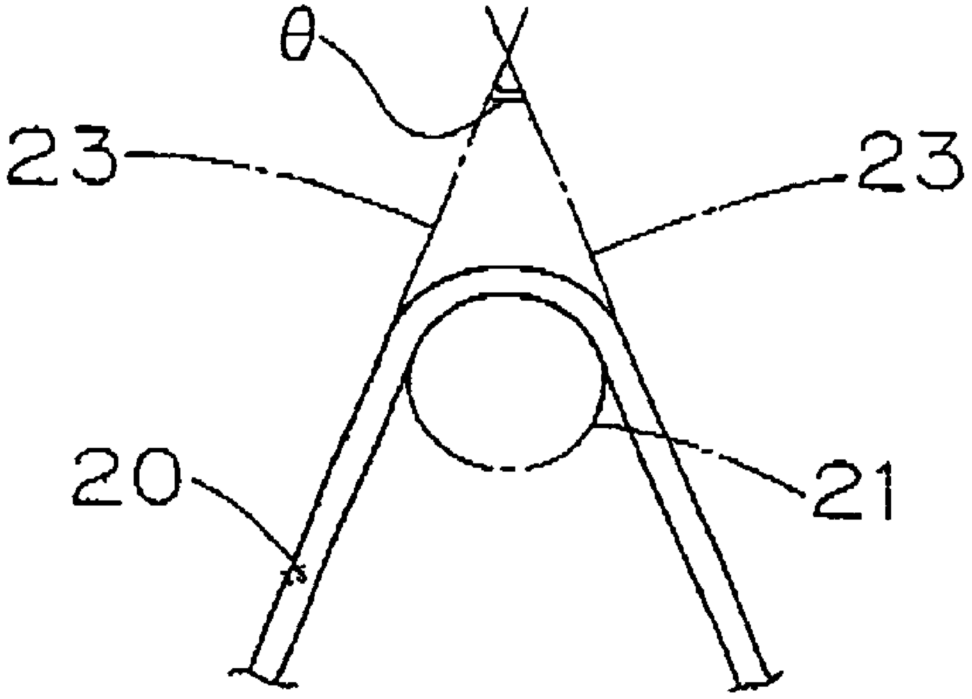
FIG. 3 is an explanatory view of an opening angle to be measured in the method of FIG. 2.

The endless belt was cut into a strip having a size of 25 mm×150 mm for producing a testpiece 20, as shown in FIG. 2. The testpiece 20 was wound around a metallic pipe 21 having a diameter of 13 mm. In turn, both distal ends of the testpiece 20 were lapped each other and a load of 0.5 kg (not shown) was hung over here, which was allowed to stand at 50° C.×95% RH for 24 hours. Thereafter, the load was removed and both of the lapped distal ends were released, as shown in FIG. 3. It is theorized that both right and left lines 23 extended from each surface of the testpiece 20 to a side of the circular arc of the testpiece 20. An angle θ made by both such theorized right and left lines 23 was regarded as an opening angle and was measured. When the opening angle θ is near to 180°, bending habit (curling habit) is weak. When the opening angle θ is not less than 50°, the resulting image is not affected.

TABLE 1

| | EXAMPLE | | | | | | |
|---|---|---|---|---|---|---|---|
| | 1A | 2A | 3A | 4A | 5A | 6A | 7A |
| Content of polymer having carboxylic acids at both terminals (% by weight) | 18.7 | 18.9 | 19.0 | 18.5 | 5.4 | 29.9 | 19.0 |
| PAI (Mn) | 32,000 | 23,000 | 19,000 | 17,000 | 27,000 | 16,000 | 19,000 |
| Total number of moles (a) | 0.3954 | 0.3954 | 0.3954 | 0.3954 | 0.3954 | 0.3954 | 0.3954 |
| Total number of moles [(b) + (c)] | 0.3933 | 0.3854 | 0.3907 | 0.3883 | 0.3944 | 0.3870 | 0.3907 |
| B1/B2 (molar ratio) | 100/0 | 100/0 | 100/0 | 100/0 | 100/0 | 100/0 | 100/0 |
| Elongation modulus (MPa) | 4,000 | 4,100 | 4,200 | 4,400 | 4,700 | 2,300 | 4,100 |
| Elongation at break (%) | 30 | 33 | 41 | 35 | 20 | 55 | 40 |
| Creep rate (%) | 0.1 | 0.1 | 0.1 | 0.1 | 0.2 | 0.3 | 0.2 |
| Flexibility (number of MIT times) | 2,100 | 2,200 | 3,000 | 3,000 | 2,000 | 2,500 | 2,800 |
| Bench durability test (×1,000 times) | 410 | 440 | 600 | 600 | 400 | 490 | 590 |
| Flame retardancy (UL94VTM test) | VTM-1 | VTM-1 | VTM-1 | VTM-1 | VTM-0 | VTM-1 | VTM-0 |
| Water absorption (% by weight) | 1.0 | 1.0 | 1.5 | 2.0 | 2.1 | 1.3 | 1.7 |
| Opening angle (°) | 80 | 80 | 70 | 60 | 55 | 75 | 70 |

TABLE 2

| | EXAMPLE | | | | | | COMPARATIVE EXAMPLE |
|---|---|---|---|---|---|---|---|
| | 8A | 9A | 10A | 11A | 12A | 13A | A |
| Content of polymer having carboxylic acids at both terminals (% by weight) | 3.3 | 20.2 | 16.7 | 17.5 | 18.5 | 16.1 | — |
| PAI (Mn) | 28,000 | 10,000 | 13,000 | 20,000 | 19,000 | 21,000 | 29,000 |
| Total number of moles (a) | 0.3954 | 0.3491 | 0.5119 | 0.3954 | 0.3954 | 0.3954 | — |
| Total number of moles [(b) + (c)] | 0.3907 | 0.3907 | 0.3907 | 0.3847 | 0.3832 | 0.3892 | — |
| B1/B2 (molar ratio) | 100/0 | 100/0 | 100/0 | 75/25 | 90/10 | 50/50 | 100/0 |
| Elongation modulus (MPa) | 4,800 | 4,000 | 4,100 | 4,400 | 4,200 | 4,600 | 5,000 |

TABLE 2-continued

| | EXAMPLE | | | | | | COMPARATIVE EXAMPLE |
|---|---|---|---|---|---|---|---|
| | 8A | 9A | 10A | 11A | 12A | 13A | A |
| Elongation at break (%) | 17 | 20 | 25 | 35 | 39 | 30 | 12 |
| Creep rate (%) | 0.2 | 0.3 | 0.2 | 0.1 | 0.1 | 0.1 | 0.2 |
| Flexibility (number of MIT times) | 1,200 | 1,500 | 1,800 | 2,900 | 3,000 | 2,700 | 500 |
| Bench durability test (×1,000 times) | 300 | 350 | 380 | 590 | 600 | 550 | 100 |
| Flame retardancy (UL94VTM test) | VTM-0 | VTM-1 | VTM-1 | VTM-1 | VTM-1 | VTM-1 | VTM-0 |
| Water absorption (% by weight) | 2.2 | 1.6 | 1.3 | 0.9 | 1.0 | 0.8 | 3.0 |
| Opening angle (°) | 50 | 85 | 75 | 90 | 80 | 100 | 30 |

From the above-mentioned results, all Examples had high elongation modulus and elongation at break, low creep ratio, and excellent durability. Especially, since each of Examples 11A to 13A used a combination of an aromatic polycarboxylic acid anhydride (B1) and an aromatic polycarboxylic acid dianhydride (B2), water absorption was low, an opening angle was large and curling property was excellent.

On the contrary, since the base layer of Comparative Example A was formed by using PAI wherein a polymer having carboxylic acids at both terminals thereof was not copolymerized, Comparative Example A had small elongation at break, inferior durability, large water absorption, a small opening angle, and inferior curling property.

Next, Examples of the endless belt according to the second embodiment will be described with reference to Comparative Example.

EXAMPLE 1B

Preparation of Base Layer Material

First, 22 parts of MDI (Milionate MT (Mn: 250.26) available from NIPPON POLYURETHANE INDUSTRY CO., LTD. of Tokyo, Japan), 29 parts of TODI (TODI/R203 (Mn: 264.29) available from NIPPON SODA CO., LTD. of Tokyo, Japan), 38 parts of trimellitic anhydride (Mn: 192.12) as aromatic polycarboxylic acid anhydride (B1), 10 parts of a specific silicone polymer having two hydroxyl groups at either terminal thereof (component (D)) (X-22-176DX (OH value: 30 mgKOH/g, Mn:3740) available from Shin-Etsu Chemical Co., LTD. of Tokyo, Japan) and 280 parts of NMP solvent were put into a reaction vessel provided with a stirrer, a nitrogen inlet tube, a thermometer and a cooling tube and then taking one hour for heating thereof up to 130° C. wile stirring at nitrogen gas stream, and then reaction was continuously conducted as it was for about 5 hours at 130° C., and then the reaction was stopped. Thus, PAI-NMP solution (solid content: 29% by weight) was prepared. Then, 4 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Preparation of Surface Layer Material

The surface layer material was prepared by blending 100 parts of silicone-grafted acrylic resin (SYMAC US-380 available from TOAGOSEI CO., LTD. of Tokyo, Japan) with 500 parts of toluene solvent and mixing by means of an agitating blade.

Production of Endless Belt

A mold (cylindrical body) was prepared. The above-mentioned base layer material was spray-coated onto a surface of the mold for forming a base layer on a surface of the mold and was heated at 250° C. for 2 hours. Then, the above-mentioned surface layer material was coated onto a surface of the base layer by dipping method, and was dried, and then the thus obtained belt was withdrawn by air-blowing onto space between the base layer and the cylindrical body. Thus, the two-layer endless belt having a base layer (thickness: 80 μm) and a surface layer (thickness: 1 μm) formed onto a surface of the base layer, was produced.

EXAMPLE 2B

The base layer material was prepared in substantially the same manner as in Example 1B, except that the blend ratio of trimellitic anhydride was changed to 37 parts, a specific silicone polymer having carboxylic acids at both terminals thereof (BY-16-750 (acid value: 75 mgKOH/g, Mn: 1496) available from Dow Corning Toray Silicone Co., Ltd. of Tokyo, Japan) was used instead of the silicone polymer having two hydroxyl groups at either terminal thereof (X-22-176DX available from Shin-Etsu Chemical Co., LTD. of Tokyo, Japan). An endless belt was produced in substantially the same manner as in Example 1B, except that this base layer material was used.

EXAMPLE 3B

Preparation of Base Layer Material

First, 22 parts of MDI (Milionate MT available from NIPPON POLYURETHANE INDUSTRY CO., LTD. of Tokyo, Japan), 29 parts of TODI (TODI/R203 available from NIPPON SODA CO., LTD. of Tokyo, Japan), 36 parts of trimellitic anhydride, 10 parts of a specific silicone polymer having two hydroxyl groups at either terminal thereof (component (D)) (X-22-176DX) available from Shin-Etsu Chemical Co., LTD. of Tokyo, Japan), 20 parts of polybutadiene having carboxylic acids at both terminals thereof (C-1000 (acid value: 52 mgKOH/g, Mn:2158)) available from NIPPON SODA CO., LTD. of Tokyo, Japan) and 330 parts of NMP solvent were put into a reaction vessel provided with a stirrer, a nitrogen inlet tube, a thermometer and a cooling tube and then taking one hour for heating thereof up to 130° C. at while stirring nitrogen gas stream, and then reaction was continuously conducted as it was for about 5 hours at 130° C., and then the reaction was stopped. Thus, PAI-NMP solution (solid content; 30% by weight) was prepared. Then, 4 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Production of Endless Belt

An endless belt was produced in substantially the same manner as in Example 1B, except that the thus obtained base layer material was used. Thus, the two-layer endless belt having a base layer (thickness: 80 μm) and a surface layer (thickness: 1 μm) formed onto a surface of the base layer, was produced.

EXAMPLE 4B

Preparation of Base Layer Material

First, 22 parts of MDI (Milionate MT available from NIPPON POLYURETHANE INDUSTRY CO., LTD. of Tokyo, Japan), 29 parts of TODI (TODI/R203 available from NIPPON SODA CO., LTD. of Tokyo, Japan), 35 parts of trimellitic anhydride, 10 parts of a specific silicone polymer having two carboxylic acids at both terminals thereof (component (D)) (BY16-750 available from Dow Corning Toray Silicone Co., LTD. of Tokyo, Japan), 20 parts of polybutadiene having carboxylic acids at both terminals thereof (C-1000 (acid value: 52 mgKOH/g, Mn:2158) available from NIPPON SODA CO., LTD. of Tokyo, Japan) and 330 parts of NMP solvent were put into a reaction vessel provided with a stirrer, a nitrogen inlet tube, a thermometer and a cooling tube and then taking one hour for heating thereof up to 130° C. at while stirring nitrogen gas stream, and then reaction was continuously conducted as it was for about 5 hours at 130° C., and then the reaction was stopped. Thus, PAI-NMP solution (solid content: 30% by weight) was prepared. Then, 4 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Production of Endless Belt

An endless belt was produced in substantially the same manner as in Example 1B, except that the thus obtained base layer material was used. Thus, the two-layer endless belt having a base layer (thickness: 80 μm) and a surface layer (thickness: 1 μm) formed onto a surface of the base layer, was produced.

EXAMPLE 5B

The base layer material was prepared in substantially the same manner as in Example 4B, except that hydrogenated polybutadiene having carboxylic acids at both terminals thereof (CI-1000 (acid value: 59 mgKOH/g, Mn: 1902) available from NIPPON SODA CO., LTD. of Tokyo, Japan) was used instead of polybutadiene having carboxylic acids at both terminals thereof (C-1000 available from NIPPON SODA CO., LTD. of Tokyo, Japan). An endless belt was produced in substantially the same manner as in Example 1B, except that this base layer material was used.

EXAMPLE 6B

The base layer material was prepared in substantially the same manner as in Example 4B, except that the blend ratio of trimellitic anhydride was changed to 36 parts, a polyacrylonitrile-butadiene copolymer having carboxylic acids at both terminals thereof (CTBN1300X13 (acid value: 32 mgKOH/g, Mn: 3506) available from UBE INDUSTRIES, LTD. of Tokyo, Japan) was used instead of polybutadiene having carboxylic acids at both terminals thereof (C-1000 available from NIPPON SODA CO., LTD. of Tokyo, Japan). An endless belt was produced in substantially the same manner as in Example 1B, except that this base layer material was used.

EXAMPLE 7B

The base layer material was prepared in substantially the same manner as in Example 4B, except that the blend ratio of trimellitic anhydride was changed to 34 parts, polyester having carboxylic acids at both terminals thereof (CLOVAX 300-8S (acid value: 103 mgKOH/g, Mn: 1089) available from Nippon Kasei Chemical Co., Ltd. of Tokyo, Japan) was used instead of polybutadiene having carboxylic acids at both terminals thereof (C-1000 available from NIPPON SODA CO., LTD. of Tokyo, Japan). An endless belt was produced in substantially the same manner as in Example 1B, except that this base layer material was used.

EXAMPLE 8B

The base layer material was prepared in substantially the same manner as in Example 4B, except that the blend ratio of trimellitic anhydride was changed to 36 parts and polyamide having carboxylic acids at both terminals thereof (acid value: 38.0 mgKOH/g, Mn: 2953) comprising a dimer acid of $C_{36}$ (comprising a dimer of unsaturated fatty acids of $C_{18}$) and hexamethylene diamine was used instead of polybutadiene having carboxylic acids at both terminals thereof (c-1000 available from NIPPON SODA CO., LTD. of Tokyo, Japan). An endless belt was produced in substantially the same manner as in Example 1B, except that this base layer material was used.

EXAMPLE 9B

Preparation of Base Layer Material

First, 22 parts of MDI (Milionate MT available from NIPPON POLYURETHANE INDUSTRY CO., LTD. of Tokyo, Japan), 29 parts of TODI (TODI/R203 available from NIPPON SODA CO., LTD. of Tokyo, Japan), 35 parts of trimellitic anhydride, 10 parts of the specific silicone polymer having carboxylic acids at both terminals thereof (component (D)) (BY-16-750 available from Dow Corning Toray Silicone Co., Ltd. of Tokyo, Japan), 20 parts of polybutadiene having carboxylic acids at both terminals thereof (C-1000 available from NIPPON SODA CO., LTD. of Tokyo, Japan) and 330 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 30% by weight) was prepared. Then, 4 parts of carbon black (Show Black N220 available from SHOWA CABOT K.K. of Tokyo, Japan) and 8 parts of phosphorus-containing polyester (phosphorus content: 5.5% by weight) produced in the following manner were blended in the thus obtained PAI-NMP solution, and was mixed by an agitating blade, and then was dispersed by a ball mill. Thus, the base layer material was prepared.

The phosphorus-containing polyester was prepared as follows. First, 65 parts of dimethyl phthalate, 290 parts of ethylene glycol and 125 parts of a phosphinic acid derivative represented from the following structural formula (9) were mixed, and 0.1% by weight of manganese acetate, 0.5% by weight of lithium acetate and 0.03% by weight of antimony trioxide were further mixed relative to a total amount of the dimethyl terephthalate and the phosphinic acid derivative as a catalyst. Thus, ester exchange reaction was conducted at a normal pressure and 160 to 220° C. for 3 hours and a approximate theoretical amount of methanol was withdrawn. In turn, the temperature of the system was increased to 250° C. and the pressure was gradually reduced down to 1 Torr or less for reaction for 6 hours. Thus, phosphorous-containing polyester (Mn: 9,000) containing phosphorous at 5.5% by weight was obtained.

Production of Endless Belt

An endless belt was produced in substantially the same manner as in Example 1B, except that the thus obtained base layer material was used. Thus, the two-layer endless belt having a base layer (thickness; 80 μm) and a surface layer (thickness: 1 μm) formed onto a surface of the base layer, was produced.

EXAMPLE 10B

The base layer material was prepared in substantially the same manner as in Example 4B, except that the blend ratio of trimellitic anhydride was changed to 37 parts, the blend ratio of the silicone polymer having carboxylic acids at both terminals thereof (BY-16-750 available from Dow Corning Toray Silicone Co., Ltd. of Tokyo, Japan) was changed to 1 part and the blend ratio of the NMP solvent was changed to 310 parts. An endless belt was produced in substantially the same manner as in Example 1B, except that this base layer material was used.

EXAMPLE 11B

The base layer material was prepared in substantially the same manner as in Example 4B, except that the blend ratio of trimellitic anhydride was changed to 34 parts, the blend ratio of the silicone polymer having carboxylic acids at both terminals thereof (BY-16-750 available from Dow Corning Toray Silicone Co., Ltd. of Tokyo, Japan) was changed to 26 parts and the blend ratio of the NMP solvent was changed to 370 parts. An endless belt was produced in substantially the same manner as in Example 1B, except that this base layer material was used.

EXAMPLE 12B

The base layer material was prepared in substantially the same manner as in Example 4B, except that the blend ratio of trimellitic anhydride was changed to 37 parts, the blend ratio of the silicone polymer having carboxylic acids at both terminals thereof (BY-16-750 available from Dow Corning Toray Silicone Co., Ltd. of Tokyo, Japan) was changed to 0.7 parts and the blend ratio of the NMP solvent was changed to 300 parts. An endless belt was produced in substantially the same manner as in Example 1B, except that this base layer material was used.

EXAMPLE 13B

The base layer material was prepared in substantially the same manner as in Example 4B, except that the blend ratio of trimellitic anhydride was changed to 33 parts, the blend ratio of the silicone polymer having carboxylic acids at both terminals thereof (BY-16-750 available from Dow Corning Toray Silicone Co., Ltd. of Tokyo, Japan) was changed to 30 parts and the blend ratio of the NMP solvent was changed to 380 parts. An endless belt was produced in substantially the same manner as in Example 1B, except that this base layer material was used.

EXAMPLE 14B

Preparation of Base Layer Material

First, 22 parts of MDI (Milionate MT available from NIPPON POLYURETHANE INDUSTRY CO., LTD. of Tokyo, Japan), 29 parts of TODI (TODI/R203 available from NIPPON SODA CO., LTD. of Tokyo, Japan), 27 parts of trimellitic anhydride as aromatic polycarboxylic acid anhydride (B1), 19 parts of ethylene glycolbis (anhydro trimellitate) (Rikasid TMEG-100 (Mn: 410.3) available from New Japan Chemical Co., Ltd. of Osaka, Japan) as aromatic polycarboxylic acid dianhydride (B2), 10 parts of the specific silicone polymer having carboxylic acids at both terminals thereof (component (D)) (BY-16-750 available from Dow Corning Toray Silicone Co., Ltd. of Tokyo, Japan), 20 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 360 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 30% by weight) was prepared. Then, 4 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Production of Endless Belt

An endless belt was produced in substantially the same manner as in Example 1B, except that the thus obtained base layer material was used. Thus, the two-layer endless belt having a base layer (thickness: 80 μm) and a surface layer (thickness: 1 μm) formed onto a surface of the base layer, was produced.

COMPARATIVE EXAMPLE B

Preparation of Base Layer Material

A base layer material was prepared in substantially the same manner as in Example 1B, except that the specific silicone polymer and the polymer having carboxylic acids at both terminals thereof were not blended. First, 22 parts of MDI (Milionate MT available from NIPPON POLYURETHANE INDUSTRY CO., LTD. of Tokyo, Japan), 29 parts of TODI (TODI/R203 available from NIPPON SODA CO., LTD. of Tokyo, Japan), 38 parts of trimellitic anhydride and 250 parts of NMP solvent were put into a reaction vessel provided with a stirrer, a nitrogen inlet tube, a thermometer and a cooling tube and then taking one hour for heating thereof up to 130° C. at nitrogen gas stream, and then reaction was continuously conducted as it was for about 5 hours at 130° C., and then the reaction was stopped. Thus, PAI-NMP solution (solid content: 26% by weight) was prepared. Then, 4 parts of carbon black (Show Black N220 available from SHOWA CABOT K.K. of Tokyo, Japan) was blended in the thus obtained PAI-NMP solution, and was mixed by an agitating blade, and then was dispersed by a ball mill. Thus, the base layer material was prepared.

Production of Endless Belt

An endless belt was produced in substantially the same manner as in Example 1B, except that the thus obtained base layer material was used. Thus, the two-layer endless belt having a base layer (thickness: 80 μm) and a surface layer (thickness: 1 μm) formed onto a surface of the base layer, was produced.

The endless belts of Examples 1B to 14B and Comparative Example B thus produced were evaluated on the following criteria. The results are shown in Tables 3 to 5. Each blend ratio of the specific silicone polymer (content of component (D) in a total amount of the components (A) to(D)) is also shown in Tables 3 to 5.

Coefficient of Static Friction

Each of coefficient of static friction of the thus obtained endless belt was measured by means of STATIC FRICTION TESTER μs (Type: 94i available from HEIDON CO., LTD. of Tokyo, Japan).

TABLE 3

| | EXAMPLE | | | | | | |
|---|---|---|---|---|---|---|---|
| | 1B | 2B | 3B | 4B | 5B | 6B | 7B |
| PAI (Mn) | 24,000 | 22,000 | 25,000 | 32,000 | 27,000 | 22,000 | 30,000 |
| Content of specific silicone polymer (% by weight) | 11 | 11 | 9 | 9 | 9 | 9 | 9 |
| Elongation modulus (MPa) | 3,200 | 3,200 | 3,000 | 3,000 | 3,000 | 3,000 | 3,200 |
| Elongation at break (%) | 30 | 30 | 35 | 40 | 35 | 40 | 35 |
| Creep rate (%) | 0.2 | 0.2 | 0.2 | 0.2 | 0.2 | 0.2 | 0.2 |
| Flexibility (number of MIT times) | 5,200 | 6,100 | 8,600 | 10,000 | 8,400 | 9,000 | 8,600 |
| Bench durability test (×1,000 times) | 550 | 600 | 720 | 840 | 700 | 750 | 720 |
| Coefficient of static friction | 0.1 | 0.2 | 0.1 | 0.2 | 0.2 | 0.2 | 0.2 |
| Flame retardancy (UL94VTM test) | VTM-1 | VTM-1 | VTM-1 | VTM-1 | VTM-1 | VTM-1 | VTM-0 |
| Water absorption (% by weight) | 2.0 | 2.1 | 1.5 | 1.5 | 1.4 | 1.9 | 1.4 |
| Opening angle (°) | 60 | 60 | 70 | 75 | 75 | 70 | 65 |

TABLE 4

| | EXAMPLE | | | | | | |
|---|---|---|---|---|---|---|---|
| | 8B | 9B | 10B | 11B | 12B | 13B | 14B |
| PAI (Mn) | 17,000 | 33,000 | 14,000 | 20,000 | 25,000 | 21,000 | 26,000 |
| Content of specific silicone polymer (% by weight) | 10 | 10 | 1 | 26 | 0.7 | 30 | 8 |
| Elongation modulus (MPa) | 3,300 | 3,000 | 4,000 | 2,700 | 4,200 | 2,000 | 3,800 |
| Elongation at break (%) | 35 | 40 | 28 | 70 | 25 | 120 | 35 |
| Creep rate (%) | 0.2 | 0.2 | 0.1 | 0.4 | 0.1 | 1 | 0.1 |
| Flexibility (number of MIT times) | 8,700 | 9,600 | 3,300 | 10,000 | 2,400 | 150,000 | 10,000 |
| Bench durability test (×1,000 times) | 730 | 820 | 500 | 1500 | 300 | 350 | 900 |
| Coefficient of static friction | 0.2 | 0.2 | 0.3 | 0.1 | 0.4 | 0.1 | 0.2 |
| Flame retardancy (UL94VTM test) | VTM-1 | VTM-0 | VTM-1 | VTM-1 | VTM-1 | VTM-0 | VTM-1 |
| Water absorption (% by weight) | 1.4 | 1.3 | 1.9 | 1.2 | 1.6 | 1.2 | 0.8 |
| Opening angle (°) | 60 | 75 | 70 | 75 | 75 | 75 | 110 |

TABLE 5

| | COMPARATIVE EXAMPLE B |
|---|---|
| PAI (Mn) | 29,000 |
| Content of specific silicone polymer (% by weight) | — |
| Elongation modulus (MPa) | 5,000 |
| Elongation at break (%) | 12 |
| Creep rate (%) | 0.2 |
| Flexibility (number of MIT times) | 500 |
| Bench durability test (×1,000 times) | 100 |
| Coefficient of static friction | 0.5 |
| Flame retardancy (UL94VTM test) | VTM-0 |
| Water absorption (% by weight) | 3.0 |
| Opening angle (°) | 30 |

From the above-mentioned results, all Examples had high elongation modulus and elongation at break, low creep ratio, and excellent durability. Also, since coefficient of static friction was low, blade curling and toner releasability could be improved. Especially, since Example 14B used a combination of an aromatic polycarboxylic acid anhydride (B1) and an aromatic polycarboxylic acid dianhydride (B2), water absorption was low, an opening angle was large and curling property was excellent.

On the contrary, since the base layer of Comparative Example B was formed by using PAI wherein a specific polymer and a polymer having carboxylic acids at both terminals thereof were not copolymerized, Comparative Example B had small elongation at break and inferior durability. Also, since Comparative Example B had a high coefficient of static friction, blade curling and toner releasability were not improved. Further, Comparative Example B had large water absorption, a small opening angle, and inferior curling property.

Next, Examples of the endless belt according to the third embodiment will be described with reference to Comparative Example.

Prior to Examples and Comparative Examples, the following materials were prepared.

MDI

Milionate MT (Mn: 250.26) available from NIPPON POLYURETHANE INDUSTRY CO., LTD. of Tokyo, Japan

TODI

TODI/R203 (Mn:264.29) available from NIPPON SODA CO., LTD. of Tokyo, Japan

Aromatic Polycarboxylic Acid Anhydride

Trimellitic anhydride (Mn: 192.12)

Aromatic Polycarboxylic Acid Dianhydride

Ethylene glycolbis (anhydro trimellitate) (Rikasid TMEG-100 (Mn: 410.3) available from New Japan Chemical Co., Ltd. of Osaka, Japan)

Fluorine-Containing Low-Molecular Weight Organic Chemical Compound a

A fluorine surface active agent (PF636 available from OMNOVA SOLUTIONS INC. of Ohio, USA; Mn: 1122; OH value: 100 mgKOH/g) represented by the above-mentioned structural formula (5a)

Fluorine-Containing Low-Molecular Weight Organic Chemical Compound b

Pentadecafluoroocthanol (Mn: 400) represented by the above-mentioned structural formula (2b)

Fluorine-Containing Low-Molecular Weight Organic Chemical Compound c 3-(2-perfluorooctylethoxy)-1,2-dihydroxypropane (Mn: 538) represented by the above-mentioned structural formula (3a)

Fluorine-Containing Low-Molecular Weight Organic Chemical Compound d

N-propyl-N-(2-3-dihydroxypropyl) perfluorooctane-sulfone amide (Mn: 615) represented by the above-mentioned structural formula (4a)

Polymer Having Carboxylic Acids at Both Terminals Thereof

Polyester having carboxylic acids at both terminals thereof obtained by condensation-reacting 3-methyl-1,5-pentanediol and sebacic acid (acid value: 56 mgKOH/g, Mn: 2,000)

Polydimethylsiloxane Compound

Silicone polymer having two reactive groups at either terminal thereof include a silicone polymer having two hydroxyl groups at one terminal thereof (X-22-176DX available from Shin-Etsu Chemical Co., Ltd. of Tokyo, Japan) (OH value: 30 mgKOH/g, Mn: 3,740)

Phosphorus-Containing Polyester

First, 65 parts of dimethyl terephthalate, 290 parts of ethylene glycol and 125 parts of a phosphinic acid derivative represented from the above-mentioned structural formula (9) were mixed, and 0.1% by weight of manganese acetate, 0.5% by weight of lithium acetate and 0.03% by weight of antimony trioxide were further mixed relative to a total amount of the dimethyl terephthalate and the phosphinic acid derivative. Thus, ester exchange reaction was conducted at a normal pressure and 160 to 220° C. for 3 hours and an approximate theoretical amount of methanol was withdrawn. In turn, the temperature of the system was increased to 250° C. and the pressure was gradually reduced down to $1.33\times10^2$ Pa or less for reaction for 6 hours. Thus, phosphorous-containing polyester containing phosphorous (weight average molecular weight: 9,000; phosphorous content: 5.5% by weight) was obtained.

PES Resin (PES Powder)

PES (E2020P) available from Mitsui Chemicals, Inc. of Tokyo, Japan

Carbon Black

Show Black N220 available from SHOWA CABOT K.K. of Tokyo, Japan

EXAMPLE 1C

Preparation of Base Layer Material

First, each material marked with * in the following table 6 was blended at a ratio as indicated as in the same table and was put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 24% by weight) was prepared. Then, each material without mark * was blended at a ratio as indicated as in the same table, and was blended in the thus obtained PAI-NMP solution, and was mixed by an agitating blade, and then was dispersed by a ball mill. Thus, the base layer material was prepared.

Preparation of Surface Layer Material

The surface layer material was prepared by blending 100 parts of a silicone-grafted acrylic resin (SYMAC US-380 available from TOAGOSEI CO., LTD. of Tokyo, Japan) with 500 parts of toluene solvent and mixing by means of an agitating blade.

Production of Endless Belt

A mold (cylindrical body) was prepared. The above-mentioned base layer material was spray-coated onto a surface of the mold for forming a base layer on a surface of the mold and was heated at 250° C. for 2 hours. Then, the above-mentioned surface layer material was coated onto a surface of the base layer by dipping method, and was dried, and then the thus obtained belt was withdrawn by air-blowing onto space between the base layer and the cylindrical body. Thus, the two-layer endless belt having a base layer (thickness: 80 μm) and a surface layer (thickness: 1 μm) formed onto a surface of the base layer, was produced.

EXAMPLE 2C to 12C and COMPARATIVE EXAMPLE C

Preparation of Base Layer Material

The base layer material was prepared in substantially the same manner as in Example 1C, except that each material shown in the following tables 6 and 7 was blended at a ratio as shown in the same tables, and the solid content of the PAI-NMP solution was changed to 26% by weight. Further, each material marked with * in the same tables means the material was blended at a ratio as indicated for preparation of the PAI-NMP solution.

Preparation of Surface Layer Material

The surface layer material was prepared in substantially the same manner as in Example 1C.

Production of Endless Belt

An endless belt was produced in substantially the same manner as in Example 1C, except that the thus obtained base layer material and surface layer material were used. Thus, the two-layer endless belt having a base layer (thickness: 80 μm) and a surface layer (thickness: 1 μm) formed onto a surface of the base layer, was produced. Further, the content of the fluorine-containing low-molecular weight organic chemical compound (component (E)), that is, the ratio of the component (E) in a total amount of the components (A) to (E) was also shown in Tables 6 and 7.

TABLE 6

| | EXAMPLE | | | | | | |
|---|---|---|---|---|---|---|---|
| | 1C | 2C | 3C | 4C | 5C | 6C | 7C |
| MDI | *20 | *20 | *20 | *20 | *20 | *20 | *20 |
| TODI | *32 | *32 | *32 | *32 | *32 | *32 | *32 |
| Trimellitic acid anhydride | *38 | *36 | *34 | *34 | *25 | *25 | *25 |
| Ethylene glycol bis (unhydro trimellitate) | — | — | — | — | *18 | *18 | *18 |
| Polymer having carboxylic acids at both terminals | — | — | *20 | *20 | *20 | *20 | *20 |
| Fluorine-containing low-molecular weight organic chemical compound | | | | | | | |
| a | *10 | *10 | *10 | *10 | *10 | *10 | *10 |
| b | — | — | — | — | — | — | — |
| c | — | — | — | — | — | — | — |
| d | — | — | — | — | — | — | — |
| Polydimethylsiloxane compound | — | — | — | *5 | *5 | *5 | *5 |
| Phosphorus-containing polyester | — | — | — | — | — | 10 | 10 |
| PES resin | — | — | — | — | — | — | 31 |
| NMP solvent | *235 | *229 | *280 | *294 | *320 | *348 | *435 |
| Carbon black | 4 | 4 | 5 | 5 | 6 | 6 | 8 |
| PAI (Mn) | 32,000 | 28,000 | 29,000 | 30,000 | 29,000 | 29,000 | 29,000 |
| Content of fluorine-containing low-molecular weight organic chemical compound (% by weight) | 10 | 10.2 | 8.6 | 8.3 | 7.7 | 7.7 | 7.7 |

TABLE 7

| | EXAMPLE | | | | | COMPARATIVE EXAMPLE |
|---|---|---|---|---|---|---|
| | 8C | 9C | 10C | 11C | 12C | C |
| MDI | *20 | *20 | *20 | *20 | *20 | *20 |
| TODI | *32 | *32 | *32 | *32 | *32 | *32 |
| Trimellitic acid anhydride | *38 | *34 | *36 | *35 | *35 | *38 |
| Ethylene glycol bis (unhydro trimellitate) | — | — | — | — | | — |
| Polymer having carboxylic acids at both terminals | — | — | — | — | | — |
| Fluorine-containing low-molecular weight organic chemical compound | | | | | | |
| a | *1 | *22 | — | — | | — |
| b | — | — | *10 | — | — | — |
| c | — | — | — | *10 | — | — |
| d | — | — | — | — | *10 | — |

TABLE 7-continued

| | EXAMPLE | | | | | COMPARATIVE EXAMPLE |
|---|---|---|---|---|---|---|
| | 8C | 9C | 10C | 11C | 12C | C |
| Polydimethylsiloxane compound | — | — | — | — | — | — |
| Phosphorus-containing polyester | — | — | — | — | — | — |
| PES resin | — | — | — | — | — | — |
| NMP solvent | *209 | *257 | *229 | *226 | *226 | *206 |
| Carbon black | 4 | 5 | 4 | 4 | 4 | 4 |
| PAI (Mn) | 31,000 | 26,000 | 21,000 | 24,000 | 25,000 | 32,000 |
| Content of fluorine-containing low-molecular weight organic chemical compound (% by weight) | 1.1 | 20.2 | 10.2 | 10.3 | 10.3 | — |

The endless belts of Examples 1C to 12C and Comparative Example C thus produced were evaluated on the following criteria. The other properties were evaluated in accordance with the above-mentioned criteria. The results are shown in Tables 8 and 9.

Wrinkle Resistance at Moist Heat Conditions

Two metallic rollers each having a diameter of 20 mm were prepared. An endless belt having a width of 350 mm was stretched between two rollers. In such a state, one of the rollers was fixed. Both right and left ends of the roller, which did not fixed, were hung with a load of 3 kg, respectively, (in total, 6 kg). In such a state, the endless belt was allowed to stand at 45° C.×95% RH for 2 weeks. Thereafter, the endless belt was removed from the metallic rollers and was built into a commercially available full-color electrophotographic copier, and then outputted images were evaluated. The symbol X indicates that image defects occurred because wrinkles occurred circumferentially on the belt stretched over the roller. The symbol ○ indicates that good images were obtained because no wrinkles occurred circumferentially on the belt stretched over the roller.

TABLE 8

| | EXAMPLE | | | | | | |
|---|---|---|---|---|---|---|---|
| | 1C | 2C | 3C | 4C | 5C | 6C | 7C |
| Elongation modulus (MPa) | 4,700 | 4,500 | 4,000 | 3,500 | 4,000 | 3,800 | 3,700 |
| Flexibility (number of MIT times) | 1,200 | 1,100 | 3,000 | 5,000 | 4,500 | 4,000 | 3,500 |
| Bench durability test (× 1,000 times) | 200 | 180 | 400 | 600 | 550 | 500 | 450 |
| Flame retardancy (UL94VTM test) | VTM-0 | VTM-0 | VTM-1 | VTM-1 | VTM-1 | VTM-0 | VTM-0 |
| Water absorption (% by weight) | 1.0 | 1.0 | 0.9 | 0.8 | 0.7 | 0.8 | 0.5 |
| Opening angle (°) | 60 | 60 | 70 | 80 | 90 | 90 | 110 |
| Wrinkle resistance at moist heat conditions | ○ | ○ | ○ | ○ | ○ | ○ | ○ |

TABLE 9

| | EXAMPLE | | | | | COMPARATIVE EXAMPLE |
|---|---|---|---|---|---|---|
| | 8C | 9C | 10C | 11C | 12C | C |
| Elongation modulus (MPa) | 4,900 | 3,900 | 4,200 | 4,700 | 4,600 | 5,200 |
| Flexibility (number of MIT times) | 800 | 1,000 | 800 | 1,000 | 1,100 | 400 |
| Bench durability test (×1,000 times) | 150 | 160 | 150 | 160 | 180 | 80 |
| Flame retardancy (UL94VTM test) | VTM-0 | VTM-0 | VTM-0 | VTM-0 | VTM-0 | VTM-0 |
| Water absorption (% by weight) | 1.5 | 0.6 | 0.7 | 0.7 | 0.7 | 3.0 |
| Opening angle (°) | 50 | 80 | 90 | 90 | 90 | 25 |
| Wrinkle resistance at moist heat conditions | ○ | ○ | ○ | ○ | ○ | X |

From the above-mentioned results, all Examples had high elongation modulus and excellent durability, and an large opening angle and excellent curling property. Further, all Examples had low water absorption and good wrinkle resistance at moist heat conditions.

On the contrary, Comparative Example C had a small opening angle and inferior curling property, and had large water absorption and poor wrinkle resistance at moist heat conditions.

Next, Examples of the endless belt according to the fourth embodiment will be described with reference to Comparative Example.

EXAMPLE 1D

Preparation of Base Layer Material (a) Preparation of PAI-NMP Solution

First, 22 parts of MDI (Milionate MT (Mn: 250.06) available from NIPPON POLYURETHANE INDUSTRY CO., LTD. of Tokyo, Japan), 29 parts of TODI (TODI/R203 (Mn: 264.29) available from NIPPON SODA CO., LTD. of Tokyo, Japan), 36 parts of trimellitic anhydride (Mn: 192.12), 20 parts of polybutadiene having carboxylic acids at both terminals thereof (C-1000 (acid value: 52 mgKOH/g, Mn:2158) available from NIPPON SODA CO., LTD. of Tokyo, Japan) and 250 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared.

(b) A PES Resin (PES Powder) Having a Structural Unit Represented by the above-Mentioned Chemical Formula (7) as a Repetitive Unit was Prepared.

(c) Preparation of a Dispersion of an Electrically Conductive Agent 100 parts of the NMP solvent was put into a ring mill. Then, 10 parts of carbon black (Show Black N220 available from SHOWA CABOT K.K. of Tokyo, Japan) was added with stirred to the NMP solvent little by little. After a total amount of the carbon black was put therein, dispersion was started and was continued for about 10 hours for preparation of a dispersion of an electrically conductive agent.

(d) Preparation of Base Layer Material

First, 308 parts of the thus prepared PAI-NMP solution (solid content: 26% by weight) wherein 80 parts of PAI as a solid matter is contained, 20 parts of PES resin (PES powder), 50 parts of the dispersion of an electrically conductive agent and 100 parts of the NMP solvent were blended, and were mixed by an agitating blade for about 5 hours, and then was dispersed by a ball mill. Thus, the base layer material was prepared.

Preparation of Surface Layer Material

The surface layer material was prepared by blending 100 parts of a silicone-grafted acrylic resin (SYMAC US-380 available from TOAGOSEI CO., LTD. of Tokyo, Japan) with 500 parts of toluene solvent and mixing by means of an agitating blade. Thus, the surface layer material was prepared.

Production of Endless Belt

A mold (cylindrical body) was prepared. The above-mentioned base layer material was spray-coated onto a surface of the mold for forming a base layer on a surface of the mold and was heated at 250° C. for 2 hours. Then, the above-mentioned surface layer material was coated onto a surface of the base layer by dipping method, and was dried, and then the thus obtained belt was withdrawn by air-blowing onto space between the base layer and the cylindrical body. Thus, the two-layer endless belt having a base layer (thickness: 80 μm) and a surface layer (thickness: 1 μm) formed onto a surface of the base layer, was produced.

EXAMPLE 2D

The base layer material was prepared in substantially the same manner as in Example 1D, except that the blend ratio of the PAI-NMP solution (solid content: 26% by weight), wherein 50 parts of PAI as a solid matter is contained, was changed to 192 parts, the blend ratio of the PES resin (PES powder) having a structural unit represented by the above-mentioned chemical formula (7) as a repetitive unit was changed to 50 parts and the blend ratio of the NMP solvent was changed to 180 parts. An endless belt was produced in substantially the same manner as in Example 1D, except that this base layer material was used.

EXAMPLE 3D

The base layer material was prepared in substantially the same manner as in Example 1D, except that the blend ratio of the PAI-NMP solution (solid content: 26% by weight), wherein 20 parts of PAI as a solid matter is contained, was changed to 77 parts, the blend ratio of the PES resin (PES powder) having a structural unit represented by the above-mentioned chemical formula (7) as a repetitive unit was changed to 80 parts and the blend ratio of the NMP solvent was changed to 270 parts. An endless belt was produced in substantially the same manner as in Example 1D, except that this base layer material was used.

EXAMPLE 4D

The base layer material was prepared in substantially the same manner as in Example 1D, except that the blend ratio of trimellitic anhydride was changed to 35 parts and hydrogenated polybutadiene having carboxylic acids at both terminals thereof (CI-1000 (acid value: 59 mgKOH/g, Mn: 1902) available from NIPPON SODA CO., LTD. of Tokyo, Japan) was used instead of polybutadiene having carboxylic acids at both terminals thereof (C-1000 available from NIPPON SODA CO., LTD. of Tokyo, Japan). An endless belt was produced in substantially the same manner as in Example 1D, except that this base layer material was used.

EXAMPLE 5D

The base layer material was prepared in substantially the same manner as in Example 1D, except that the blend ratio of trimellitic anhydride was changed to 34 parts and polyester having carboxylic acids at both terminals thereof (CLOVAX 300-8S (acid value: 103 mgKOH/g, Mn: 1089) available from Nippon Kasei Chemical Co., Ltd. of Tokyo, Japan) was used instead of polybutadiene having carboxylic acids at both terminals thereof (C-1000 available from NIPPON SODA CO., LTD. of Tokyo, Japan). An endless belt was produced in substantially the same manner as in Example 1D, except that this base layer material was used.

EXAMPLE 6D

The base layer material was prepared in substantially the same manner as in Example 1D, except that polyamide having carboxylic acids at both terminals thereof (acid value: 38.0 mgKOH/g, Mn: 2953) comprising a dimer acid of $C_{36}$ (comprising a dimer of unsaturated fatty acids of $C_{18}$) and hexamethylene diamine was used instead of polybutadiene having carboxylic acids at both terminals thereof (C-1000 available from NIPPON SODA Co., LTD. of Tokyo, Japan). An endless belt was produced in substantially the same manner as in Example 1D, except that this base layer material was used.

EXAMPLE 7D

Preparation of Base Layer Material (a) Preparation of PAI-NMP Solution

First, 22 parts of MDI (Milionate MT (Mn: 250.06) available from NIPPON POLYURETHANE INDUSTRY CO., LTD. of Tokyo, Japan), 29 parts of TODI (TODI/R203 (Mn: 264.29) available from NIPPON SODA CO., LTD. of Tokyo, Japan), 37 parts of trimellitic anhydride, 5 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 220 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared.

(b) A PES Resin (PES Powder) Having a Structural Unit Represented by the above-Mentioned Chemical Formula (7) as a Repetitive Unit was Prepared.

(c) Preparation of a Dispersion of an Electrically Conductive Agent 100 parts of the NMP solvent was put into a ring mill. Then, 10 parts of carbon black (Show Black N220 available from SHOWA CABOT K.K. of Tokyo, Japan) was added with stirred to the NMP solvent little by little. After a total amount of the carbon black was put therein, dispersion was started and was continued for about 10 hours for preparation of a dispersion of an electrically conductive agent.

(d) Preparation of Base Layer Material

First, 308 parts of the thus prepared PAI-NMP solution (solid content: 26% by weight) wherein 80 parts of PAI as a solid matter is contained, 20 parts of PES resin (PES powder), 50 parts of the dispersion of an electrically conductive agent and 100 parts of the NMP solvent were blended, and were mixed by an agitating blade for about 5 hours, and then was dispersed by a ball mill. Thus, the base layer material was prepared.

Production of Endless Belt

An endless belt was produced in substantially the same manner as in Example 1D, except that the thus obtained base layer material was used. Thus, the two-layer endless belt having a base layer (thickness: 80 μm) and a surface layer (thickness: 1 μm) formed onto a surface of the base layer, was produced.

EXAMPLE 8D

Preparation of Base Layer Material (a) Preparation of PAI-NMP Solution

First, 22 parts of MDI (Milionate MT available from NIPPON POLYURETHANE INDUSTRY CO., LTD. of Tokyo, Japan), 29 parts of TODI (TODI/R203 (Mn:264.29) available from NIPPON SODA CO., LTD. of Tokyo, Japan), 31 parts of trimellitic anhydride, 35 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 280 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared.

(b) A PES Resin (PES Powder) Having a Structural Unit Represented by the above-Mentioned Chemical Formula (7) as a Repetitive Unit was Prepared.

(c) Preparation of a Dispersion of an Electrically Conductive Agent 100 parts of the NMP solvent was put into a ring mill. Then, 10 parts of carbon black (Show Black N220 available from SHOWA CABOT K.K. of Tokyo, Japan) was added with stirred to the NMP solvent little by little. After a total amount of the carbon black was put therein, dispersion was started and was continued for about 10 hours for preparation of a dispersion of an electrically conductive agent.

(d) Preparation of Base Layer Material

First, 308 parts of the thus prepared PAI-NMP solution (solid content: 26% by weight) wherein 80 parts of PAI as a solid matter is contained, 20 parts of PES resin (PES powder) having a structural unit represented by the above-mentioned chemical formula (7) as a repetitive unit, 50 parts of the dispersion of an electrically conductive agent and 100 parts of the NMP solvent were blended, and were mixed by an agitating blade for about 5 hours, and then was dispersed by a ball mill. Thus, the base layer material was prepared.

Production of Endless Belt

An endless belt was produced in substantially the same manner as in Example 1D, except that the thus obtained base layer material was used. Thus, the two-layer endless belt having a base layer (thickness: 80m) and a surface layer (thickness: 1 μm) formed onto a surface of the base layer, was produced.

EXAMPLE 9D

Preparation of Base Layer Material (a) Preparation of PAI-NMP Solution

First, 22 parts of MDI (Milionate MT (Mn: 250.06) available from. NIPPON POLYURETHANE INDUSTRY CO., LTD. of Tokyo, Japan), 29 parts of TODI (TODI/R203 (Mn: 264.29) available from NIPPON SODA CO., LTD. of Tokyo, Japan), 34 parts of trimellitic anhydride, 20 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 270 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130, and then the reaction was stopped. Thus, PAI-NMP solution (solid content: 26% by weight) was prepared.

(b) A PES Resin (PES Powder) Having a Structural Unit Represented by the above-Mentioned Chemical Formula (7) as a Repetitive Unit was Prepared.

(c) Preparation of a Dispersion of an Electrically Conductive Agent 100 parts of the NMP solvent was put into a ring mill. Then, 10 parts of carbon black (Show Black N220 available from SHOWA CABOT K.K. of Tokyo, Japan) was added with stirred to the NMP solvent little by little. After a total amount of the carbon black was put therein, dispersion was started and was continued for about 10 hours for preparation of a dispersion of an electrically conductive agent.

(d) Preparation of Phosphorus-Containing Polyester Resin

The phosphorus-containing polyester was prepared as follows. First, 65 parts of dimethyl phthalate, 290 parts of ethylene glycol and 125 parts of a phosphinic acid derivative represented from the above-mentioned structural formula (9) were mixed, and 0.1% by weight of manganese acetate, 0.5% by weight of lithium acetate and 0.03% by weight of antimony trioxide were further mixed relative to a total amount of the dimethyl terephthalate and the phosphinic acid derivative as a catalyst. Thus, ester exchange reaction was conducted at a normal pressure and 160 to 220° C. for 3 hours and a approximate theoretical amount of methanol was withdrawn. In turn, the temperature of the system was increased to 250° C. and the pressure was gradually reduced down to 133 Pa or less for reaction for 6 hours. Thus, phosphorous-containing polyester having weight average molecular weight of 9,000 and containing phosphorous at 5.5% by weight was obtained.

(e) Preparation of Base Layer Material

First, 308 parts of the thus prepared PAI-NMP solution (solid content: 26% by weight) wherein 80 parts of PAI as a solid matter is contained, 20 parts of PES resin (PES powder), 50 parts of the dispersion of an electrically conductive agent, 8 parts of phosphorous-containing polyester (phosphorous content: 5.5% by weight) and 130 parts of the NMP solvent were blended, and were mixed by an agitating blade for about 5 hours, and then was dispersed by a ball mill. Thus, the base layer material was prepared.

Production of Endless Belt

An endless belt was produced in substantially the same manner as in Example 1D, except that the thus obtained base layer material was used. Thus, the two-layer endless belt having a base layer (thickness: 80 μm) and a surface layer (thickness: 1 μm) formed onto a surface of the base layer, was produced.

EXAMPLE 10D

Preparation of Base Layer Material (a) Preparation of PAI-NMP Solution

First, 22 parts of MDI (Milionate MT (Mn: 250.06) available from NIPPON POLYURETHANE INDUSTRY CO., LTD. of Tokyo, Japan), 29 parts of TODI (TODI/R203 (Mn: 264.29) available from NIPPON SODA CO., LTD. of Tokyo, Japan), 37 parts of trimellitic anhydride, 3 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 220 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared.

(b) A PES Resin (PES Powder) Having a Structural Unit Represented by the above-Mentioned Chemical Formula (7) as a Repetitive Unit was Prepared.

(c) Preparation of a Dispersion of an Electrically Conductive Agent 100 parts of the NMP solvent was put into a ring mill. Then, 10 parts of carbon black (Show Black N220 available from SHOWA CABOT K.K. of Tokyo, Japan) was added with stirred to the NMP solvent little by little. After a total amount of the carbon black was put therein, dispersion was started and was continued for about 10 hours for preparation of a dispersion of an electrically conductive agent.

(d) Preparation of Base Layer Material

First, 308 parts of the thus prepared PAI-NMP solution (solid content: 26% by weight) wherein 80 parts of PAI as a solid matter is contained, 20 parts of PES resin (PES powder) having a structural unit represented by the above-mentioned chemical formula (7), 50 parts of the dispersion of an electrically conductive agent and 100 parts of the NMP solvent were blended, and were mixed by an agitating blade for about 5 hours, and then was dispersed by a ball mill. Thus, the base layer material was prepared.

Production of Endless Belt

An endless belt was produced in substantially the same manner as in Example 1D, except that the thus obtained base layer material was used. Thus, the two-layer endless belt having a base layer (thickness: 80 μm) and a surface layer (thickness: 1 μm) formed onto a surface of the base layer, was produced.

EXAMPLE 11D

Preparation of Base Layer Material (a) Preparation of PAI-NMP Solution

First, 20 parts of MDI (Milionate MT (Mn: 250.06) available from NIPPON POLYURETHANE INDUSTRY CO., LTD. of Tokyo, Japan), 25 parts of TODI (TODI/R203 (Mn: 264.29) available from NIPPON SODA CO., LTD. of Tokyo, Japan), 34 parts of trimellitic anhydride, 20 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 240 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared.

(b) A PES Resin (PES Powder) Having a Structural Unit Represented by the above-Mentioned Chemical Formula (7) as a Repetitive Unit was Prepared.

(c) Preparation of a Dispersion of an Electrically Conductive Agent 100 parts of the NMP solvent was put into a ring mill. Then, 10 parts of carbon black (Show Black N220 available from SHOWA CABOT K.K. of Tokyo, Japan) was added with stirred to the NMP solvent little by little. After a total amount of the carbon black was put therein, dispersion was started and was continued for about 10 hours for preparation of a dispersion of an electrically conductive agent.

(d) Preparation of Base Layer Material

First, 308 parts of the thus prepared PAI-NMP solution (solid content: 26% by weight) wherein 80 parts of PAT as a solid matter is contained, 20 parts of PES resin (PES powder), 50 parts of the dispersion of an electrically conductive agent and 100 parts of the NMP solvent were blended, and were mixed by an agitating blade for about 5 hours, and then were dispersed by a ball mill. Thus, the base layer material was prepared.

Production of Endless Belt

An endless belt was produced in substantially the same manner as in Example 1D, except that the thus obtained base layer material was used. Thus, the two-layer endless belt having a base layer (thickness: 80 μm) and a surface layer (thickness: 1 μm) formed onto a surface of the base layer, was produced.

EXAMPLE 12D

Preparation of Base Layer Material (a) Preparation of PAI-NMP Solution

First, 29 parts of MDI (Milionate MT (Mn: 250.06) available from NIPPON POLYURETHANE INDUSTRY CO., LTD. of Tokyo, Japan), 37 parts of TODI (TODI/R203 (Mn: 264.29) available from NIPPON SODA CO., LTD. of Tokyo, Japan), 34 parts of trimellitic anhydride, 20 parts of polyester having carboxylic acids at both terminals thereof (CLOVAX 300-8S (acid value: 103 mgKOH/g, Mn: 1089) available from Nippon Kasei Chemical Co., Ltd. of Tokyo, Japan) and 300 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared.

(b) A PES Resin (PUS Powder) Having a Structural Unit Represented by the above-Mentioned Chemical Formula (7) as a Repetitive Unit was Prepared.

(c) Preparation of a Dispersion of an Electrically Conductive Agent 100 parts of the NMP solvent was put into a ring mill. Then, 10 parts of carbon black (Show Black N220 available from SHOWA CABOT K.K. of Tokyo, Japan) was added with stirred to the NMP solvent little by little. After a total amount of the carbon black was put therein, dispersion was started and was continued for about 10 hours for preparation of a dispersion of an electrically conductive agent.

(d) Preparation of Base Layer Material

First, 308 parts of the thus prepared PAI-NMP solution (solid content: 26% by weight) wherein 80 parts of PAI as a solid matter is contained, 20 parts of PES resin (PES powder), 50 parts of the dispersion of an electrically conductive agent and 100 parts of the NMP solvent were blended, and were mixed by an agitating blade for about 5 hours, and then were dispersed by a ball mill. Thus, the base layer material was prepared.

Production of Endless Belt

An endless belt was produced in substantially the same manner as in Example 1D, except that the thus obtained base layer material was used. Thus, the two-layer endless belt having a base layer (thickness: 80 μm) and a surface layer (thickness: 1 μm) formed onto a surface of the base layer, was produced.

EXAMPLE 13D

Preparation of Surface Layer Material 100 parts of silicone resin (SR2410 available from Toray Industries, Inc. of Tokyo, Japan) and 400 parts of n-hexane were blended together by an agitating blade for preparation of the surface layer material.

Production of Endless Belt

An endless belt was produced in substantially the same manner as in Example 1D, except that the thus obtained surface layer material was used. Thus, the two-layer endless belt having a base layer (thickness: 80 μm) and a surface layer (thickness: 1 m) formed onto a surface of the base layer, was produced.

EXAMPLE 14D

Preparation of Surface Layer Material 100 parts of silicone resin (SR2316 available from Toray Industries, Inc. of Tokyo, Japan) and 400 parts of n-hexane were blended together by an agitating blade for preparation of the surface layer material.

Production of Seamless Belt

A seamless belt was produced in substantially the same manner as in Example 1D, except that the thus obtained surface layer material was used. Thus, the two-layer endless belt having a base layer (thickness: 80 μm) and a surface layer (thickness: 1 μm) formed onto a surface of the base layer, was produced.

EXAMPLE 15D

Preparation of Surface Layer Material 100 parts of silicone resin (X-41-7001 available from Shin-Etsu Chemical Co., Ltd. of Tokyo, Japan) as a solid matter, 22 parts of 2,2,4-trimethyl-1,3-pentanediolmonoiso-butylate, 10 parts of titanium oxide and 500 parts of pure water were blended together by an agitating blade for preparation of the surface layer material.

Production of Endless Belt

An endless belt was produced in substantially the same manner as in Example 1D, except that the thus obtained surface layer material was used. Thus, the two-layer endless belt having a base layer (thickness: 80 μm) and a surface layer (thickness: 1 μm) formed onto a surface of the base layer, was produced.

EXAMPLE 16D

Preparation of Surface Layer Material 100 parts of fluorine-containing copolymer resin (LUMIFLON 200 available from ASAHI GLASS CO., LTD. of Tokyo, Japan) as a solid matter, 15 parts of tetrafluoroethylene resin (LUBRON-5 available from DAIKIN INDUSTRIES, LTD. of Osaka, Japan) and 500 parts of toluene were blended together by an agitating blade for preparation of the surface layer material.

Production of Endless Belt

An endless belt was produced in substantially the same manner as in Example 1D, except that the thus obtained surface layer material was used. Thus, the two-layer endless belt having a base layer (thickness: 80 μm) and a surface layer (thickness: 1 μm) formed onto a surface of the base layer, was produced.

EXAMPLE 17D

Preparation of Thermoplastic Resin Layer Material 100 parts of PVDF resin (VT-100 available from DAIKIN INDUSTRIES, LTD. of Osaka, Japan), 10 parts of carbon black (Show Black N220 available from SHOWA CABOT K.K. of Tokyo, Japan), 500 parts of acetone solvent were blended together by an agitating blade and were dispersed by a ball mill. Thereafter, acetone solvent was further added thereto for preparation of thermoplastic resin layer material.

Production of Endless Belt

After a base layer was produced in substantially the same manner as in Example 1D, the thermoplastic resin layer material was spray-coated thereon, which, in turn, was heated and dried, and the solvent was removed for forming the thermoplastic resin layer on a surface of the base layer. Then, a surface layer was formed on a surface of the thermoplastic resin layer in the same manner as in EXAMPLE 1D. Thus, the three-layer endless belt having a base layer (thickness: 70 μm), a thermoplastic resin layer (thickness; 20 μm) formed onto a surface of the base layer and a surface layer (thickness: 1 μm) formed onto a surface of the thermoplastic resin layer, was produced.

EXAMPLE 18D

Preparation of Elastic Layer Material 100 parts of chloroprene rubber (DENKA CHLOROPRENE A-30 available from DENKI KAGAKU KOGYO KABUSHIKIKAISHA of Tokyo, Japan), 1.5 parts of a vulcanizing agent (Sanceler 22C available from SANSHIN CHEMICAL INDUSTRY CO., LTD. of Yamaguchi, Japan) and 2 parts of carbon black (Ketchen EC available from Ketchen Black International) were kneaded and were dissolved in MEK solvent for preparation of elastic layer material.

Production of Endless Belt

After a base layer was produced in substantially the same manner as in Example 1D, the elastic layer material was spray-coated thereon for forming the elastic layer on a surface of the base layer. Then, a surface layer was formed on a surface of the elastic layer in the same manner as in EXAMPLE 1D. Thus, the three-layer endless belt having a base layer (thickness: 70 μm), an elastic layer (thickness: 20 μm) formed onto a surface of the base layer and a surface layer (thickness: 1 μm) formed onto a surface of the elastic layer, was produced.

EXAMPLE 19D

Preparation of Thermoplastic Resin Layer Material 100 parts of PVDF resin (VT-100 available from DAIKIN INDUSTRIES, LTD. of Osaka, Japan), 10 parts of carbon black (Show Black N220 available from SHOWA CABOT K.K. of Tokyo, Japan), 500 parts of acetone solvent were blended together by an agitating blade and were dispersed by a ball mill. Thereafter, acetone solvent was further added thereto for preparation of thermoplastic resin layer material.

Preparation of Elastic Layer Material 100 parts of chloroprene rubber (DENKA CHLOROPRENE A-30 available from DENKI KAGAKU KOGYO KABUSHIKIKAISHA of Tokyo, Japan), 1.5 parts of a vulcanizing agent (Sanceler 22C available from SANSHIN CHEMICAL INDUSTRY CO., LTD. of Yamaguchi, Japan) and 2 parts of carbon black (Ketchen EC available from Ketchen Black International), were kneaded and were dissolved in MEK solvent for preparation of elastic layer material.

Production of Endless Belt

After a base layer was produced in substantially the same manner as in Example 1D, the thermoplastic resin layer material was spray-coated thereon, which, in turn, was heated and dried, and the solvent was removed for forming the thermoplastic resin layer on a surface of the base layer. Then, the elastic layer material was spray-coated thereon for forming the elastic layer on a surface of the thermoplastic layer. Then, a surface layer was formed on a surface of the elastic layer in the same manner as in EXAMPLE 1D. Thus, the four-layer endless belt having a base layer (thickness: 70 μm), a thermoplastic resin layer (thickness: 20 μm) formed onto a surface of the base layer, an elastic layer (thickness 20 μm) formed onto a surface of the thermoplastic resin layer and a surface layer (thickness: 1 μm) formed onto a surface of the elastic layer, was produced.

EXAMPLE 20D

The base layer material was prepared in substantially the same manner as in Example 1D, except that the blend amount of the thus prepared PAI-NMP solution (solid content: 26% by weight) wherein 99 parts of PAI as a solid matter is determined was changed to 381 parts, the blend amount of PES resin (PES powder) having the structural units represented by the above-mentioned chemical formula (7) as a repetitive unit was changed to 1 part and the blend amount of the NMP solvent was changed to 40 parts. An endless belt was produced in substantially the same manner as in Example 1D, except that this base layer material was used.

EXAMPLE 21D

The base layer material was prepared in substantially the same manner as in Example 1D, except that the blend amount of the thus prepared PAI-NMP solution (solid content: 26% by weight) wherein about 1 part of PAI as a solid matter is determined was changed to about 4 parts, the blend amount of PES resin (PES powder) having the structural units represented by the above-mentioned chemical formula (7) as a repetitive unit was changed to 99 parts and the blend amount of the NMP solvent was changed to 320 parts. An endless belt was produced in substantially the same manner as in Example 1D, except that this base layer material was used.

COMPARATIVE EXAMPLE 1D

Preparation of Base Layer Material

The base layer material was prepared in substantially the same manner as in Example 1D, except that a polymer having carboxylic acids at both terminals thereof was not blended. That is, first, 22 parts of MDI (Milionate MT (Mn: 250.06) available from NIPPON POLYURETHANE INDUSTRY CO., LTD. of Tokyo, Japan), 29 parts of TODI (TODI/R203 (Mn:264.29) available from NIPPON SODA CO., LTD. of Tokyo, Japan), 37 parts of trimellitic anhydride and 200 parts of NMP solvent were put into a reaction vessel provided with a stirrer, a nitrogen inlet tube, a thermometer and a cooling tube and then taking one hour for heating thereof up to 130° C. while stirring at nitrogen gas stream, and then reaction was continuously conducted as it was for about 5 hours at 130° C., and then the reaction was stopped. Thus, PAI-NMP solution (solid content: 26% by weight) was prepared. Then, 4 parts of carbon black (Show Black N220 available from SHOWA CABOT K.K. of Tokyo, Japan) was blended in the thus obtained PAT-NMP solution, and was mixed by an agitating blade, and then was dispersed by a ball mill. Thus, the base layer material was prepared.

Production of Endless Belt

An endless belt was produced in substantially the same manner as in Example 1D, except that the thus obtained base layer material was used. Thus, the two-layer endless belt having a base layer (thickness: 80 μm) and a surface layer (thickness: 1 μm) formed onto a surface of the base layer, was produced.

COMPARATIVE EXAMPLE 2D (a) Preparation of a Dispersion of an Electrically Conductive Agent 100 parts of the NMP solvent was put into a ring mill. Then, 10 parts of carbon black (Show Black N220 available from SHOWA CABOT K.K. of Tokyo, Japan) was added with stirred to the NMP solvent little by little. After a total amount of the carbon black was put therein, dispersion was started and was continued for about 10 hours for preparation of a dispersion of an electrically conductive agent.

(b) Preparation of Base Layer Material 100 parts of a PES resin (PES powder) having a structural unit represented by the above-mentioned chemical formula (7) as a repetitive unit, 50 parts of the thus obtained dispersion of an electrically conductive agent and 320 parts of NMP solvent were blended together and were mixed by an agitating blade for about 5 hours, which, in turn, was dispersed by means of a ball mill. Thus, the base layer material was prepared.

Production of Endless Belt

An endless belt was produced in substantially the same manner as in Example 1D, except that the thus obtained base layer material was used. Thus, the two-layer endless belt having a base layer (thickness: 80 μm) and a surface layer (thickness: 1 μm) formed onto a surface of the base layer, was produced.

Each electrical resistance uniformity of the endless belts of Examples 1D to 21D and Comparative Examples 1D to 2D thus produced was evaluated on the following criteria. The other properties were evaluated in accordance with the above-mentioned criteria. The results are shown in Tables 10 to 13. Each ratio between the number of moles (a) of isocyanate groups in the aromatic isocyanate compound, and the grand total of the total number of moles (b) of acid anhydride groups and carboxyl groups in the aromatic polycarboxylic acid anhydride and the total number of moles (c) of the carboxyl groups in the polymer having carboxylic acids at both terminals thereof is also shown in Tables 10 to 13.

Electrical Resistance Uniformity

The volume resistivities were measured at eight positions on an inner peripheral surface of an endless belt, which was circumferentially equally divided, based on resistivity test methods according to JIS K 6911. The variation between the maximum value and the minimum value was indicated by a digit. The applied voltage was 10V. In the evaluation, the symbol ○ indicates that the variation was not more than 0.5 digit, while the symbol Δ indicates that variation was over 0.55 digit and not more than 1 digit.

TABLE 10

| | EXAMPLE | | | | | | |
|---|---|---|---|---|---|---|---|
| | 1D | 2D | 3D | 4D | 5D | 6D | 7D |
| Content of polymer having carboxylic acids at both terminals (% by weight) | 18.7 | 18.7 | 18.7 | 18.9 | 19.0 | 18.5 | 5.4 |
| PAI (Mn) | 32,000 | 32,000 | 32,000 | 23,000 | 19,000 | 17,000 | 27,000 |
| Total number of moles (a) | 0.3954 | 0.3954 | 0.3954 | 0.3954 | 0.3954 | 0.3954 | 0.3954 |
| Total number of moles [(b) + (c)] | 0.3933 | 0.3933 | 0.3933 | 0.3854 | 0.3907 | 0.3883 | 0.3944 |
| Pencil hardness of surface layer | F | F | F | F | F | F | F |
| Contact angle of surface layer (°) | 105 | 105 | 105 | 105 | 105 | 105 | 105 |
| Electrical resistance uniformity | ○ | ○ | ○ | ○ | ○ | ○ | ○ |
| Opening angle (°) | 70 | 90 | 120 | 70 | 70 | 70 | 70 |
| Elongation modulus (Mpa) | 3,800 | 3,400 | 3,000 | 3,800 | 4,000 | 4,100 | 4,400 |
| Elongation at break (%) | 30 | 32 | 33 | 31 | 35 | 31 | 21 |
| Creep rate (%) | 0.1 | 0.1 | 0.1 | 0.1 | 0.1 | 0.1 | 0.1 |
| Flexibility (number of MIT times) | 2,000 | 1,800 | 1,650 | 2,100 | 2,850 | 2,900 | 1,900 |
| Bench durability test (×1,000 times) | 400 | 380 | 350 | 435 | 580 | 590 | 390 |
| Flame retardancy (UL94VTM test) | VTM-1 | VTM-1 | VTM-1 | VTM-1 | VTM-1 | VTM-1 | VTM-0 |

TABLE 11

| | EXAMPLE | | | | | | |
|---|---|---|---|---|---|---|---|
| | 8D | 9D | 10D | 11D | 12D | 13D | 14D |
| Content of polymer having carboxylic acids at both terminals (% by weight) | 29.9 | 19.0 | 3.3 | 20.2 | 16.7 | 18.7 | 18.7 |
| PAI (Mn) | 16,000 | 19,000 | 28,000 | 10,000 | 13,000 | 32,000 | 32,000 |
| Total number of moles (a) | 0.3954 | 0.3954 | 0.3954 | 0.3491 | 0.5119 | 0.3954 | 0.3954 |
| Total number of moles [(b) + (c)] | 0.3870 | 0.3907 | 0.3907 | 0.3907 | 0.3907 | 0.3933 | 0.3933 |
| Pencil hardness of surface layer | F | F | F | F | F | B | 5H |
| Contact angle of surface layer (°) | 105 | 105 | 105 | 105 | 105 | 103 | 102 |
| Electrical resistance uniformity | ○ | ○ | ○ | ○ | ○ | ○ | ○ |
| Opening angle (°) | 70 | 70 | 70 | 70 | 70 | 70 | 70 |
| Elongation modulus (MPa) | 2,500 | 3,900 | 4,500 | 3,800 | 3,900 | 3,800 | 3,900 |
| Elongation at break (%) | 45 | 35 | 20 | 30 | 30 | 30 | 30 |
| Creep rate (%) | 0.2 | 0.1 | 0.1 | 0.1 | 0.1 | 0.1 | 0.1 |
| Flexibility (number of MIT times) | 2,300 | 2,700 | 1,100 | 1,300 | 1,600 | 2,100 | 2,000 |
| Bench durability test (×1,000 times) | 485 | 570 | 290 | 345 | 360 | 410 | 405 |
| Flame retardancy (UL94VTM test) | VTM-1 | VTM-0 | VTM-0 | VTM-1 | VTM-1 | VTM-1 | VTM-1 |

TABLE 12

| | EXAMPLE | | | | | | |
|---|---|---|---|---|---|---|---|
| | 15D | 16D | 17D | 18D | 19D | 20D | 21D |
| Content of polymer having carboxylic acids at both terminals (% by weight) | 18.7 | 18.7 | 18.7 | 18.7 | 18.7 | 18.7 | 18.7 |
| PAI (Mn) | 32,000 | 32,000 | 32,000 | 32,000 | 32,000 | 32,000 | 32,000 |
| Total number of moles (a) | 0.3954 | 0.3954 | 0.3954 | 0.3954 | 0.3954 | 0.3954 | 0.3954 |
| Total number of moles [(b) + (c)] | 0.3933 | 0.3933 | 0.3933 | 0.3933 | 0.3933 | 0.3933 | 0.3933 |
| Pencil hardness of surface layer | F | F | F | F | F | F | F |
| Contact angle of surface layer (°) | 80 | 120 | 105 | 105 | 105 | 105 | 105 |
| Electrical resistance uniformity | ○ | ○ | ○ | ○ | ○ | ○ | ○ |
| Opening angle (°) | 70 | 70 | 70 | 70 | 70 | 50 | 140 |
| Elongation modulus (MPa) | 3,800 | 3,800 | 3,200 | 2,800 | 2,500 | 3,700 | 3,000 |
| Elongation at break (%) | 30 | 30 | 30 | 30 | 30 | 30 | 20 |
| Creep rate (%) | 0.1 | 0.1 | 0.1 | 0.2 | 0.2 | 0.1 | 0.1 |
| Flexibility (number of MIT times) | 2,000 | 2,000 | 2,100 | 2,200 | 2,300 | 2,000 | 1,000 |
| Bench durability test (×1,000 times) | 400 | 400 | 380 | 360 | 340 | 390 | 200 |
| Flame retardancy (UL94VTM test) | VTM-1 | VTM-1 | VTM-1 | VTM-1 | VTM-1 | VTM-1 | VTM-1 |

TABLE 13

| | COMPARATIVE EXAMPLE | |
|---|---|---|
| | 1D | 2D |
| Content of polymer having carboxylic acids at both terminals (% by | — | — |
| PAI (Mn) | 29,000 | — |
| Total number of moles (a) | — | — |
| Total number of moles [(b) + (c)] | — | — |
| Pencil hardness of surface layer | F | F |
| Contact angle of surface layer (°) | 105 | 105 |
| Electrical resistance uniformity | ○ | ○ |
| Opening angle (°) | 30 | 150 |
| Elongation modulus (MPa) | 5,000 | 2,800 |
| Elongation at break (%) | 12 | 10 |
| Creep rate (%) | 0.2 | 0.1 |
| Flexibility (number of MIT times) | 500 | 250 |
| Bench durability test (×1,000 times) | 100 | 50 |
| Flame retardancy (UL94VTM test) | VTM-0 | VTM-1 |

From the above-mentioned results, all Examples had uniform electrical resistance, large opening angle, high elongation modulus and elongation at break, low creep ratio, and excellent durability.

On the contrary, since the base layer of Comparative Example 1D was formed by using PAI wherein a polymer having carboxylic acids at both terminals thereof was not copolymerized, Comparative Example 1D had small elongation at break and inferior durability. Also, since Comparative Example 1D did not contain the PES resin, Comparative Example 1D had small opening angle and inferior curling property. Since Comparative Example 2D used the PES resin solely and thus did not contain a specific modified PAI, durability was inferior.

INDUSTRIAL APPLICABILITY

The endless belt of the present invention is preferably used as an intermediate transfer belt, a transfer-sheet transport belt or the like in an electrophotographic apparatus using electrophotographic technologies such as a full-color LBP (Laser Beam Printer) or a full-color PPC (Plane Paper Copier).

What is claimed is:

1. An endless belt for transferring a toner image to be used in an electrophotographic apparatus, the belt being circumferentially driven in a state that a surface of the belt is in contact with or is adjacent to a photoreceptor of the electrophotographic apparatus, wherein a base layer of the belt comprises a modified polyamide imide resin formed by copolymerizing: (A) an aromatic isocyanate compound; (B) an aromatic polycarboxylic acid anhydride; and (C) a polymer having carboxylic acids at both terminals thereof, wherein a content of a structural unit induced from the polymer having carboxylic acids at both terminals thereof (component (C)) is within a range from 5 to 30% by weight based on a total amount of the modified polyamide imide resin.

2. The endless belt according to claim 1, wherein the component (C) is at least one polymer selected from the group consisting of polybutadiene having carboxylic acids at both terminals thereof, hydrogenated polybutadiene having carboxylic acids at both terminals thereof, polyester having carboxylic acids at both terminals thereof and polyamide having carboxylic acids at both terminals thereof.

3. The endless belt according to claim 1, wherein the base layer is formed by the modified polyamide imide resin and phosphorus-containing polyester resin.

4. The endless belt according to claim 1, wherein the anhydride of the component (B) is a combination of an aromatic polycarboxylic acid anhydride (B1) and an aromatic polycarboxylic acid dianhydride (B2).

5. The endless belt according to claim 4, wherein molar ratio of the component (B1) and the component (B2) is (B1)/(B2)=90/10 to 50/50.

6. The endless belt according to claim 1, wherein the component (A) is a combination of diphenylmethane diisocyanate (MDI) and tolidine diisocyanate (TODI).

7. The endless belt according to claim 1, wherein the modified polyamide imide resin formed by copolymerizing the components (A) to (C) has an elongation at break within a range of 20 to 55%.

8. The endless belt according to claim 1, wherein the modified polyamide imide resin formed by copolymerizing the components (A) to (C) has an elongation modulus within a range of 2300 to 4700 MPa.

9. The endless belt according to claim 1, wherein the endless belt has a creep rate within a range of 0.1 to 0.3%, the creep rate being obtained by: cutting the belt into a strip so as to prepare a testpiece having a size of 20 mm×180 mm; hanging up the testpiece with a load of 250±5 g applied to an end thereof allowing the testpiece to stand at 50° C.×95% for 24 hours; and calculating the creep rate of the testpiece.

10. The endless belt according to claim 1, wherein a surface layer is formed on an outer peripheral surface of the base layer.

11. The endless belt according to claim 10, wherein the surface layer is formed of a silicone-grafted acrylic resin which is a graft polymer having an acrylic resin (main chain) grafted with a silicone resin.

* * * * *